(12) United States Patent
Amend, Jr. et al.

(10) Patent No.: US 12,138,790 B2
(45) Date of Patent: Nov. 12, 2024

(54) SYSTEMS AND METHODS FOR SKU INDUCTION, DECANTING AND AUTOMATED-ELIGIBILITY ESTIMATION

(71) Applicant: Berkshire Grey Operating Company, Inc., Bedford, MA (US)

(72) Inventors: John Richard Amend, Jr., Belmont, MA (US); Timothy Barber, Marlborough, MA (US); Benjamin Cohen, Somerville, MA (US); Christopher Geyer, Arlington, MA (US); Evan Glasgow, Wexford, PA (US); James Guillochon, Arlington, MA (US); Kirsten Wang, Maynard, MA (US); Victoria Hinchey, Winchester, MA (US); Jennifer Eileen King, Oakmont, PA (US); Thomas Koletschka, Cambridge, MA (US); Guoming Alex Long, Wexford, PA (US); Kyle Maroney, North Attleboro, MA (US); Matthew T. Mason, Pittsburgh, PA (US); William Chu-Hyon McMahan, Cambridge, MA (US); Samuel Naseef, Medford, MA (US); Kevin O'Brien, Belmont, MA (US); Dimitry Pechyoni, Newton, MA (US); Joseph Romano, Arlington, MA (US); Max Saccoccio, Andover, MA (US); Jessica Scolnic, Newton, MA (US); Prasanna Velagapudi, Pittsburgh, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 236 days.

(21) Appl. No.: 17/512,234

(22) Filed: Oct. 27, 2021

(65) Prior Publication Data

US 2022/0134543 A1 May 5, 2022

Related U.S. Application Data

(60) Provisional application No. 63/107,680, filed on Oct. 30, 2020.

(51) Int. Cl.
 *B25J 9/16* (2006.01)
 *B25J 9/12* (2006.01)

(52) U.S. Cl.
 CPC ............. *B25J 9/1602* (2013.01); *B25J 9/12* (2013.01); *B25J 9/1653* (2013.01); *B25J 9/1664* (2013.01)

(58) Field of Classification Search
 CPC . B25J 9/1602; B25J 9/12; B25J 9/1653; B25J 9/1664; B25J 9/1697; B65G 1/1378;
 (Continued)

(56) References Cited

U.S. PATENT DOCUMENTS

| 5,190,162 A | 3/1993 | Hartlepp |
| 5,713,473 A | 2/1998 | Satake et al. |

(Continued)

FOREIGN PATENT DOCUMENTS

| CN | 116583466 A | 8/2023 |
| WO | 2016100235 A1 | 6/2016 |

(Continued)

OTHER PUBLICATIONS

International Search Report and Written Opinion issued by the European Patent Office, as the International Searching Authority, in related International Application No. PCT/US2021/056846 on Mar. 2, 2022, 15 pages.

(Continued)

*Primary Examiner* — Kyle T Johnson
(74) *Attorney, Agent, or Firm* — Gesmer Updegrove LLP

(57) ABSTRACT

An object induction system is disclosed for assigning handling parameters to an object. The system includes an analysis system, an association system, and an assignment system. The analysis system includes at least one characteristic perception system for providing perception data regarding an object to be processed. The association system includes an object information database and assigns association data to the object responsive to commonality with any of the characteristic perception data with any of the characteristic recorded data. The assignment system is for assigning programmable motion device handling parameters to the indicia perception data based on the association data, and includes a workflow management system as well as a separate operational controller.

23 Claims, 26 Drawing Sheets

(58) Field of Classification Search
CPC ............. B65G 47/905; G05B 19/4183; G05B 2219/31304; G05B 2219/31305; G05B 2219/39106; G05B 2219/39107; G05B 2219/39543; G05B 2219/40053; G05B 2219/40542; G05B 2219/40543; G05B 2219/40554; G05B 19/4182; Y02P 90/02
See application file for complete search history.

(56) References Cited

U.S. PATENT DOCUMENTS

| | | | |
|---|---|---|---|
| 5,794,788 A | 8/1998 | Massen | |
| 5,875,434 A | 2/1999 | Matsuoka et al. | |
| 5,990,437 A | 11/1999 | Coutant et al. | |
| 6,060,677 A | 5/2000 | Ulrichsen et al. | |
| 6,079,570 A | 6/2000 | Oppliger et al. | |
| 6,311,892 B1 | 11/2001 | O'Callaghan et al. | |
| 6,685,031 B2 | 2/2004 | Takizawa | |
| 8,718,814 B1 | 5/2014 | Clark et al. | |
| 8,731,711 B1 | 5/2014 | Joplin et al. | |
| 9,174,758 B1 | 11/2015 | Rowley et al. | |
| 9,227,323 B1* | 1/2016 | Konolige | H04N 5/33 |
| 9,364,865 B2 | 6/2016 | Kim | |
| 9,492,923 B2 | 11/2016 | Wellman et al. | |
| 10,007,827 B2 | 6/2018 | Wagner et al. | |
| 10,625,305 B2 | 4/2020 | Wagner et al. | |
| 10,625,432 B2 | 4/2020 | Wagner et al. | |
| 10,639,678 B2 | 5/2020 | Cherry et al. | |
| 11,416,695 B2 | 8/2022 | Wagner et al. | |
| 11,458,507 B2 | 10/2022 | Wagner et al. | |
| 2002/0179502 A1 | 12/2002 | Cerutti et al. | |
| 2014/0365010 A1* | 12/2014 | Yasuda | G06V 20/64 348/91 |
| 2015/0081090 A1 | 3/2015 | Dong | |
| 2015/0086304 A1* | 3/2015 | Hasman | B65G 1/1378 414/269 |
| 2015/0283704 A1* | 10/2015 | Watanabe | B25J 9/1612 700/262 |
| 2015/0375398 A1 | 12/2015 | Penn et al. | |
| 2016/0167228 A1* | 6/2016 | Wellman | B25J 9/1602 901/3 |
| 2017/0021499 A1 | 1/2017 | Wellman et al. | |
| 2017/0320102 A1* | 11/2017 | McVaugh | B07C 5/38 |
| 2019/0217471 A1* | 7/2019 | Romano | B25J 9/1664 |
| 2019/0358810 A1* | 11/2019 | Odhner | B25J 15/0009 |
| 2019/0361672 A1 | 11/2019 | Odhner et al. | |
| 2020/0016746 A1* | 1/2020 | Yap | G06Q 10/08 |
| 2020/0017315 A1* | 1/2020 | Yap | B25J 9/1612 |
| 2020/0039746 A1 | 2/2020 | Lert, Jr. et al. | |
| 2020/0078938 A1* | 3/2020 | Bradski | B25J 9/1697 |
| 2020/0130935 A1* | 4/2020 | Wagner | B65G 61/00 |
| 2020/0269429 A1* | 8/2020 | Chavez | B25J 19/023 |
| 2020/0316782 A1 | 10/2020 | Chavez et al. | |
| 2020/0407178 A1 | 12/2020 | Battles et al. | |
| 2021/0009351 A1* | 1/2021 | Beinhofer | G06Q 10/08 |
| 2021/0173603 A1 | 6/2021 | Collet et al. | |
| 2022/0097237 A1 | 3/2022 | Brooks et al. | |
| 2022/0134543 A1* | 5/2022 | Amend, Jr. | B25J 9/1602 700/245 |
| 2022/0184666 A1 | 6/2022 | Wicks et al. | |
| 2022/0245583 A1 | 8/2022 | Hinojosa et al. | |
| 2023/0053089 A1 | 2/2023 | Fosnight et al. | |
| 2023/0191621 A1 | 6/2023 | Menon et al. | |
| 2023/0219753 A1* | 7/2023 | Bates | B65G 1/1378 414/277 |
| 2023/0242353 A1 | 8/2023 | Tondreau, III et al. | |
| 2023/0286019 A1 | 9/2023 | Ryan et al. | |
| 2024/0199349 A1* | 6/2024 | Deshpande | B65G 47/905 |

FOREIGN PATENT DOCUMENTS

| | | |
|---|---|---|
| WO | 2019169418 A2 | 9/2019 |
| WO | 2022093955 A1 | 5/2022 |

OTHER PUBLICATIONS

Notification Concerning Transmittal of International Preliminary Report on Patentability and the International Preliminary Report on Patentability issued by the International Bureau of WIPO in related International Application No. PCT/US2021/056846 on May 11, 2023, 10 pages.

Communication pursuant to Rules 161(1) and 162 EPC issued by the European Patent Office in related European Patent Application No. 21820357.8 on Jun. 6, 2023, 3 pages.

* cited by examiner

SYSTEMS AND METHODS FOR SKU INDUCTION, DECANTING AND AUTOMATED-ELIGIBILITY ESTIMATION

PRIORITY

The present application claims priority to U.S. Provisional Patent Application No. 63/107,680 filed Oct. 30, 2020, the disclosure of which is hereby incorporated by reference in its entirety.

BACKGROUND

The invention generally relates to programmable motion processing systems, and relates in particular to programmable motion (e.g., robotic) systems intended for use in environments requiring, for example, that a variety of objects (e.g., articles, parcels or packages) be processed (e.g., sorted and/or otherwise distributed) to several output destinations.

Many object distribution systems receive objects in an organized or disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination location, as determined by identification information associated with the object, which may be determined by a label printed on the object. The destination location may take many forms, such as a bag or a bin or a tote.

Automated systems for order fulfillment have also been proposed. A challenge however, is that any automated system must be capable in many applications of handling a wide variety of objects of varying size, weight, volume, center of mass and shape, as well as objects and/or packaging having low pose authority (such as clothing packaged in plastic bags), or low position authority (such as round or cylindrical objects that may roll or otherwise move after being placed).

Further, many object distribution systems receive objects (e.g., SKU items, parcels, packages, etc.) from one or more shipping entities, for distribution to a wide variety of destinations. Such object distribution systems must therefore sometimes accommodate induction of objects for which little or no information is available. Such unknown objects may be processed by hand, but in an automated object processing systems, such processing by human personnel may be disruptive or otherwise impractical.

There remains a need for a more efficient and more cost effective object induction system for an object distribution system that distributes objects of a variety of sizes and weights into appropriate collection bins or trays of fixed sizes, yet is efficient in handling objects of such varying sizes, weights, compositions, and identities.

SUMMARY

In accordance with an aspect, the invention provides an object induction system for assigning handling parameters to an object. The object induction system includes an analysis system, an association system, and an assignment system. The analysis system includes at least one characteristic perception system for providing perception data regarding an object to be processed. The characteristic perception data includes data relating to any of a weight, height width, length, weight, center of mass, object description, object category and at least one image. The association system includes an object information database with characteristic recorded data including data relating to any of a weight, height width, length, weight, center of mass, object description, object category and at least one image for a plurality of objects. The association system is for assigning association data to the object responsive to commonality with any of the characteristic perception data with any of the characteristic recorded data. The assignment system is for assigning programmable motion device handling parameters to the indicia perception data based on the association data. The assignment system includes a workflow management system as well as a separate operational controller. The programmable motion device handling parameters include any of a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped.

In accordance with another aspect, the invention provides an object induction system for an object processing system including at least one programmable motion device. The object induction system includes an analysis system, a handling parameter system, and an assignment system. The analysis system includes at least one characteristic perception system for providing perception data regarding an object to be processed. The characteristic perception data includes data relating to any of a weight, height, width, length, weight, center of mass, object description, object category and at least one image. The handling parameter input system is for obtaining handling parameters input data regarding the object. The handling parameter data includes data relating to any of whether the object is able to roll following placement, whether the object is fragile, whether the object is stackable, whether the object is crushable, whether the object is deformable, whether the object is too thin to be processed, whether the object includes glass and whether the object is non-rigid. The assignment system is for assigning programmable motion device handling parameters to the indicia perception data. The assignment system includes a workflow management system as well as a separate operational controller. The programmable motion device handling parameters include any of a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped.

In accordance with a further aspect, the invention provides an object induction system for an object processing system including at least one programmable motion device. The object induction system includes an indicia perception system, an analysis system, a handling parameter input system, a non-transitory storage medium, and an assignment system. The indicia perception system is for providing indicia perception data regarding identifying indicia of an object to be processed. The analysis system includes at least one characteristic perception system for providing perception data regarding the object to be processed. The characteristic perception data includes data relating to any of a weight, height, width, length, weight, center of mass, object description, object category and at least one image. The handling parameter input system is for obtaining handling parameters input data regarding the object. The handling parameter data including data relates to any of whether the object is able to roll following placement, whether the object is fragile, whether the object is stackable, whether the object is crushable, whether the object is deformable, whether the object is too thin to be processed, whether the object includes glass and whether the object is non-rigid. The non-transitory medium is for storing the characteristic perception data and the handling parameter input data as associated with the indicia perception data. The assignment system is for assigning programmable motion device handling parameters to the indicia perception data. The programmable motion device handling parameters include any of a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped.

BRIEF DESCRIPTION OF THE DRAWINGS

The following description may be further understood with reference to the accompanying drawings in which.

Figure 1:
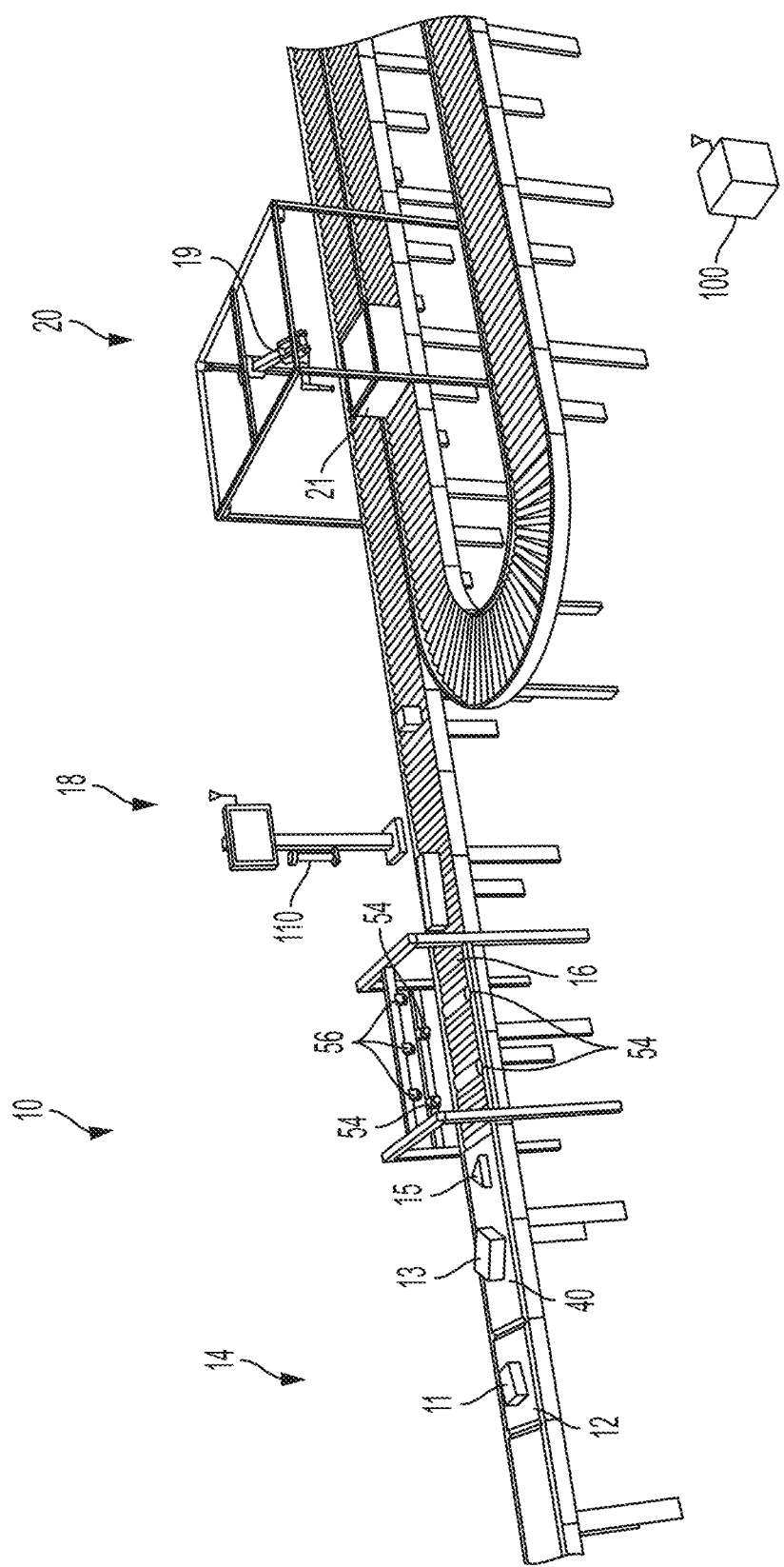
FIG. 1 shows an illustrative diagrammatic view of an induction system including an input system in accordance with an aspect of the present invention.

The drawings are shown for illustrative purposes only.

DETAILED DESCRIPTION

In accordance with certain aspects, the invention provides a system and process for inducting objects into an automated object processing system. For example, personnel at warehouse receives a SKU that it had not previously processed. The human personnel scans the barcode to identify the object. Then the person scans the object with a machine that measures the height, width, length and weight of the object (such as with a CUBISCAN® scanner sold by Quantronix, Inc. of Farmington, UT). The personnel can then add additional information about the SKU (such as whether it's a fragile item) that might aid in either the classification of the SKU, or the determination of handling parameters. That additional information may be entered in a GUI or by scanning a sheet showing pictures and barcodes (as discussed below). Then the personnel decants the case of that new SKU into a tote, and because the whole process was associated with the SKU barcode and the tote barcode, the database now has information about the tote contents.

In the background, the weight and dimension data, as well as the additional information provided by the personnel, is used to compute at a separate server whether the SKU is eligible for automation, and what the handling parameters are (e.g., optionally involving machine learning comes in to extrapolate on a new SKU). These parameters are then used to route the SKU to manual picking cells, or specific automated picking cells.

Current object processing warehouses have existing equipment and processes entirely built around the manual processes that have been in use for decades. While some automation systems force the warehouse to adapt around the new automated equipment (e.g., add lines on the floor for robots to use to drive around, use X scanners, put items at Y height . . . etc.), systems of various aspects of the present invention provide equipment that adapt to existing warehouses.

When adding robotic picking systems into existing warehouses there need to be systems in place to prepare items for robotic picking. Some warehouses receive truckloads of sealed cardboard boxes and process whatever is inside entirely manually (e.g., a person will move the box, cut it open, and place individual items into new boxes). In these cases, the robot is not a direct replacement for a person. Other process optimizations need to be made to guarantee efficiency and functionality of the robots. Tasks that generally need to be done include the following: first, objects eligible for robotic picking need to be chosen. Some items will be too heavy, too large, too small, too light, etc., while others will be packaged improperly. Eligibility can sometimes be known by using item data, but other times, the object must be visually inspected as received from vendors. Second, the objects must then be placed in optimal containers to be conveyed and presented to the robot for robotic picking. Robots cannot pick objects out of just any container. Objects tightly packed into a cardboard box, for example, may be difficult to pick using a robot.

Systems disclosed herein enumerate ways to deal with these two tasks (and other tasks that could be considered to be value add for the warehouse and/or for robotic picking). Many of the disclosed ideas combine automation and manual processes, using a balance to capture the strengths of each. The outcome is a net reduction in labor with an increased system efficiency. A goal is to increase throughput rate.

A SKU is a stock keeping unit and represents a kind of item. Each kind and size of shampoo represents a different SKU. An object (e.g., unit or an each) is one of something. A case is usually a cardboard box containing multiple units of the same SKU. Quality assurance (QA) typically refers to a part of a retailer's organization tasked with ensuring that the right goods get to the right places without damage. The warehouse management system (WMS) is the computer system that communicates with the robot cells. The WMS tells the robot what orders to fulfill, e.g., "pick one item out of tote with barcode Z, and put it into an empty container, then indicate what its barcode is." A robot control system (RCS) centralizes information about SKUs, and conveys to all robots operating at a site what to do when it receives a SKU-new or previously encountered. An automated storage and retrieval system (AS/RS) is an automated system that stores and retrieves totes; in the context of warehouses for store replenishment or e-commerce, these totes contain one SKU, or are subdivided into compartments, each of which contain one SKU.

There are two important parameters: automation eligibility and handling parameters. Automation eligibility involves using a flag that indicates whether to send a given SKU to a robot or not (or to a type of robot if there are multiple different types of robots). The handling parameters involve (where an object is automation eligible), what parameters such as robot speed, suction cup, or vacuum pressure and any other parameters to be employed while handling the SKU. These two parameters need to be set for all SKUs that the robot cells could encounter. Warehouses often have 100s of 1,000s of SKUs, so it is often intractable to set these parameters manually.

In accordance with various aspects, systems and processes are provided for determining the eligibility for automation of SKUs by performing the evaluation on-cell. In one method, the warehouse management system (WMS) assumes that all new SKUs are automation eligible and can be routed to a robot. The robot then attempts to pick all SKUs and detects from (a) drops; (b) mis-picks; (c) plural-picks; (d) inability to pick the tote to empty; or (c) any other measure that indicates performance was out of norm, that it did a bad job picking a particular SKU. In this instance the SKU or the tote containing the SKU could be flagged and sent automatically to QA (building QA, decant station, or other location) to make an automation eligibility decision manually.

There can be an optimization or scheduling of when to do these evaluation picks described above. There is a risk of wasting time doing the first evaluation picks, because the robot systems may mis-pick, drop, etc. These new SKUs could be evaluated at a time in the day where the systems are more idle in accordance with an aspect. These new SKUs could be evaluated while weighing the costs (potential for error and manual intervention at the cell) and benefits (expanding the number of SKUs that can be automatically picked) while hitting operational measures (meeting daily throughput targets), and dependent on measures like how often a given object is likely to be picked based on information about SKU velocity (i.e., how often ordered).

When in this mode of evaluating a new SKU, the system may also operate more conservatively than with previously encountered SKUs. The robot may move more slowly, or otherwise change parameters to, for example, take a little bit longer. The system may also perform exploratory motions, e.g., jiggling the item, without actually doing a full transfer motion, so as to further evaluate handle-ability of the SKU. During these evaluation picks, the cell might notify human personnel or operators that it is in an evaluation mode, so that they may more quickly come to the rescue if needed.

In accordance with another aspect, system and methods involve using customer return data or other customer feedback (good or bad). Such systems and methods may use customer return information to inform handling parameters or automation eligibility. In this case, the WMS sends categorical or qualitative information from the receiving customer or retail store to the RCS such as: happy with item as received, item was damaged, or received wrong number of items. This information could be associated with a specific SKU, or with a specific customer order in the case of e-commerce, or with a case/box of items sent to a store. When the exact unit can be determined, then all the sensor data and handling parameters for that specific unit can be associated with other objects, and used as inputs to machine learning algorithms that better choose handling parameters to avoid damage, or generally improve customer satisfaction.

In accordance with a further aspect, systems and methods are provided that use a pick and decant test station for training of human personnel and robots. In this instance, instead of assuming all new SKUs are automation eligible, new SKUs are examined by a separate automated system. This system may, for example, automatically pick the items repeatedly to test their automation eligibility. This would be a test cell that is not in the usual flow of goods through the warehouse. The operation may be bin-to-bin, which is to fill a left-hand tote with the SKU, and transfer all the units to a right-hand tote. Once the left-hand tote is empty, transfer those items back to the right-hand tote; repeat many times to determine compatibility and other pick parameters on new SKUs. Errors at this cell are much less expensive, and don't impact operations. Alternatively, this may be a semi-automated or fully manual process. A manual gripper test-bench may be employed to try picks (equivalent of hose w/suction cup on it), which would evaluate whether the system could grip the item. At this system, a human personnel could also train the robot how to grasp items. The test bench can be used for human personnel to determine decant decisions (best face up), including for example, other directions for decant (max cases per tote, etc.), and whether the objects could be processed without the test bench.

FIG. 1, for example, shows a SKU induction system 10 that processes and records data regarding objects that are being fed to an object processing system. The induction system 10 includes an input station 14 to which new objects 11, 13, 15 are presented, for example, in a singulated stream on a conveyor 40. The objects may, for example, be provided in a case of homogenous new objects. One object from each such case may be presented for entry into the system. Any of the conveyors of the systems discussed herein may be cleated or non-cleated conveyors, and the systems may monitor movement of the conveyors (and thereby the objects thereon) via a plurality of sensors and/or conveyor speed control systems. The induction system includes a weight sensing conveyor system 12, a response evaluation section 16, an information entry system 18, and a bin preparation system 20, e.g., including a programmable motion device 19 for placing objects into bins 21 for processing by the object processing system.

Figure 2:
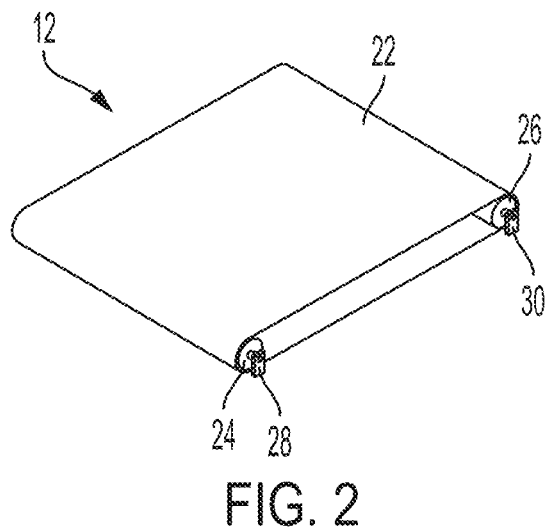
FIG. 2 shows an illustrative diagrammatic view of the weight sensing conveyor section of the input system of FIG. 1.
Figure 3:
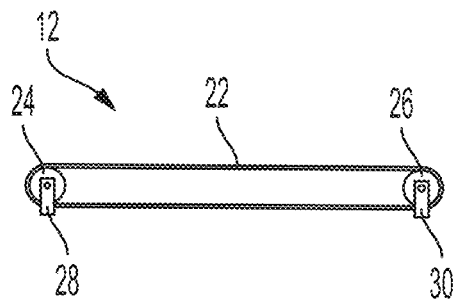
FIG. 3 shows an illustrative diagrammatic side view of the weight sensing conveyor section of FIG. 2.

The weight sensing conveyor system includes a conveyor section 22 that is mounted on rollers 24, 26, each of which is mounted at both ends on a pair of load cells 28, 30 (only one of which is shown at one end of each roller 24, 26) as shown in FIG. 2 in a side view, and in FIG. 3 in an isometric view. Damaged packages may also be identified by the perception system, for example, if a package appears to be wet or leaking. Moisture sensitive sensors may be employed in connection with conveyor 40 in any of the pre-processing systems discussed herein by having a load cell 28, 30 include moisture sensors. In other embodiments, cameras (e.g., one trillion fps cameras that are able to track photons) that are able to detect moisture may also be used in such induction systems. Any dampness detected would indicate that the object is likely damaged, requiring exception processing.

Figure 4:
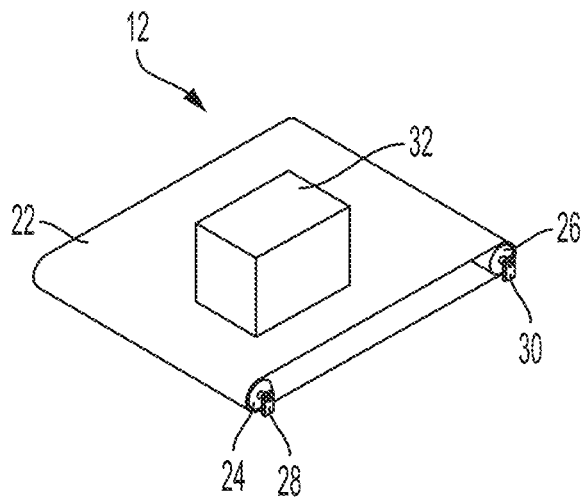
FIG. 4 shows an illustrative diagrammatic view of the weight sensing conveyor section of FIG. 2 with an unknown object thereon.
Figure 5:
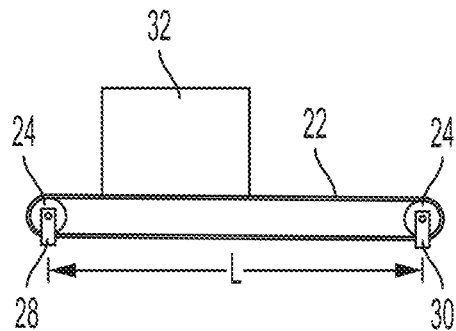
FIG. 5 shows an illustrative diagrammatic side view of the weight sensing conveyor section and object of FIG. 4.
Figure 6:
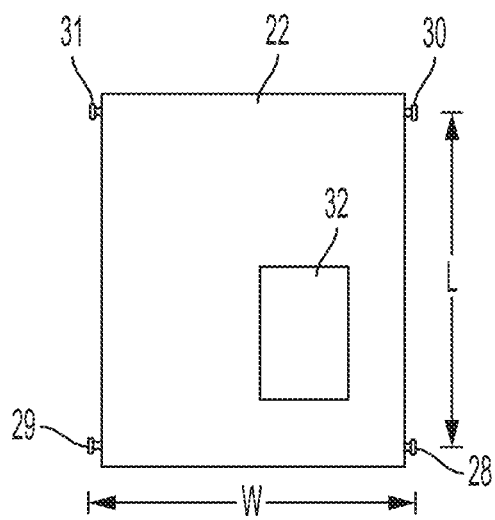
FIG. 6 shows an illustrative diagrammatic plan view of the weight sensing conveyor section and object of FIG. 4.
Figure 7:
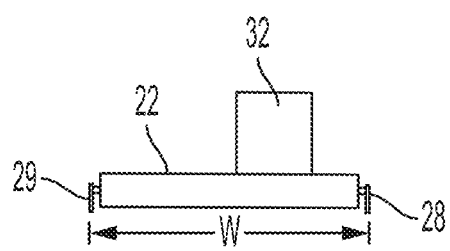
FIG. 7 shows an illustrative diagrammatic end view of the weight sensing conveyor section and object of FIG. 4.

With reference to FIG. 4, the system may further provide that a processing system with the conveyor section 22 with an object 32 on the conveyor section 22 may determine not only the weight of the object 32, but (with further reference to FIGS. 5-7) may further use the difference between the ends of the lengths and the ends of the widths, as well as weights perceived by each of the load cells 28-31, to determine an area of the center of mass of the object 32 in accordance with a further aspect of the present invention. FIG. 5 shows a side view of the object on the conveyor along a length L of the conveyor section, and FIG. 7 shows an end view of the object on the conveyor along a width W of the conveyor section. FIG. 6 shows a plan view of the conveyor section.

Figure 8:
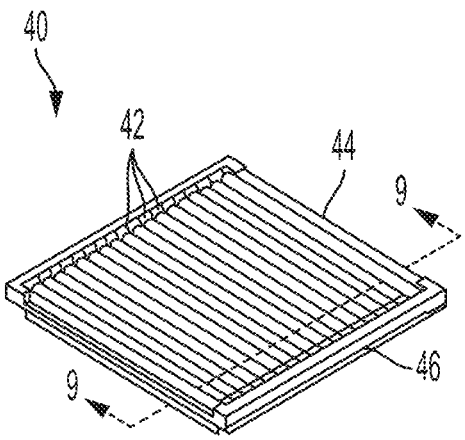
FIG. 8 shows an illustrative diagrammatic view of a scale system with multiple rollers for use in a system of an aspect of the present invention.
Figure 9:
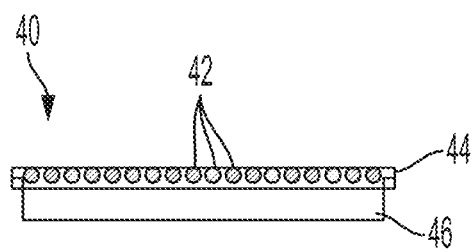
FIG. 9 shows an illustrative diagrammatic side view of the scale system of FIG. 8.
Figure 10:
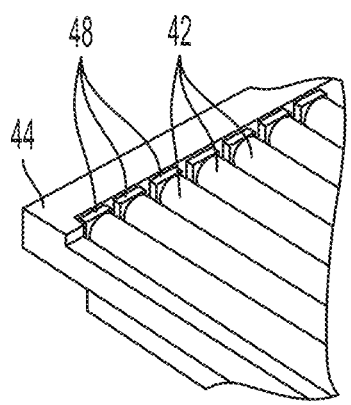
FIG. 10 shows an illustrative diagrammatic enlarged view of a portion of the scale system of FIG. 8.

FIG. 8 shows a scale system 40 that includes multiple rollers 42 mounted within a frame 44 on a base 46. With further reference to the side view in FIG. 9 and the enlarged view in FIG. 10, each roller 42 is mounted to the frame 44 via a load cell or force torque sensor 48 on either end of each roller 42. The system 40 may be used in any of the systems discussed herein. By monitoring the outputs of each of the load cells or force torque sensors 48, the center of the mass of an object on the rollers may be determined.

Such systems therefore, that provide weight sensing in the presentation conveyor may include one or more load cells or weight sensitive mechanisms embedded into the surface on which objects are presented to a programmable motion device such as an articulated arm. Each object's weight and/or observed density (weight/volume) as may be estimated using the programmable motion system's cameras or range sensors that can perceive volume.

Figure 11:
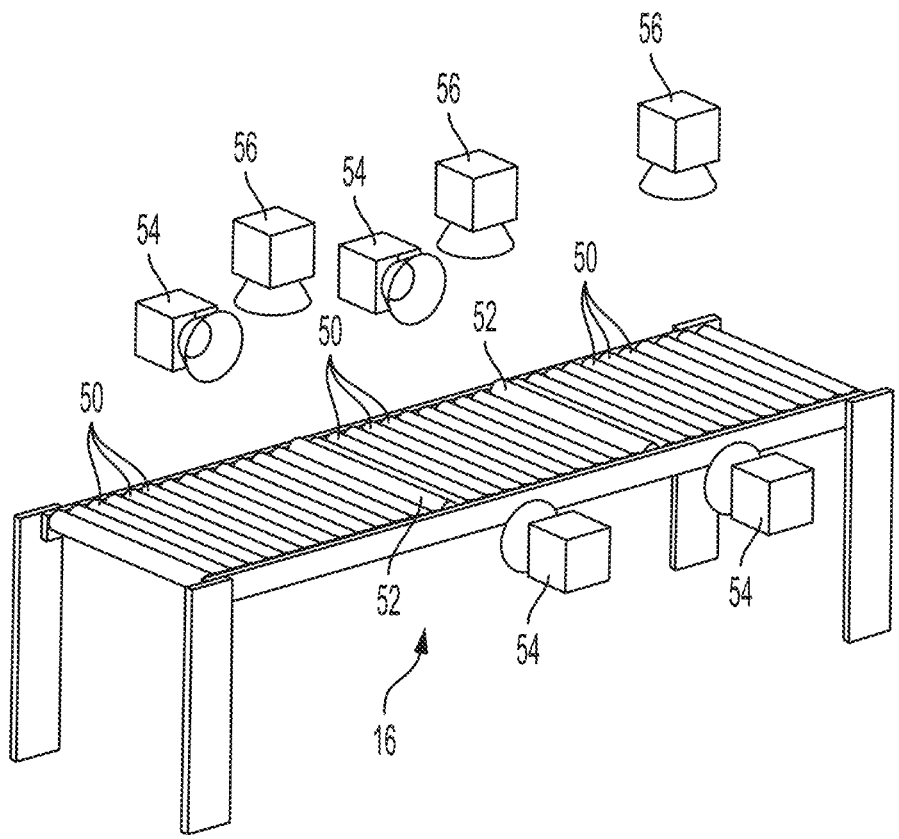
FIG. 11 shows an illustrative diagrammatic view of a response evaluation section for use in a system in accordance with an aspect of the present invention.
Figure 12A:
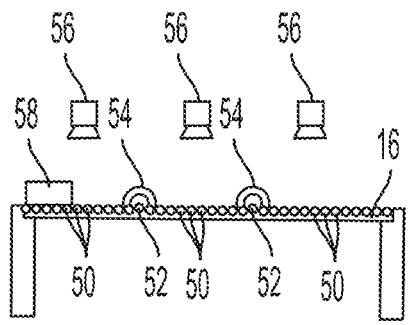
FIGS. 12A-12D show illustrative diagrammatic side views of the response evaluation section of FIG. 11 as an object is moved over the response evaluation section.
Figure 12B:
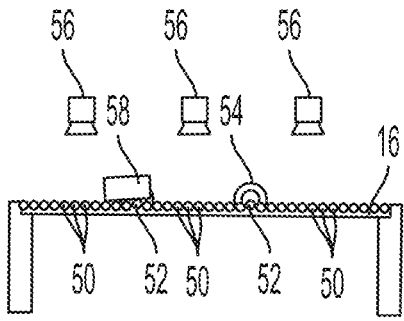
Figure 12C:
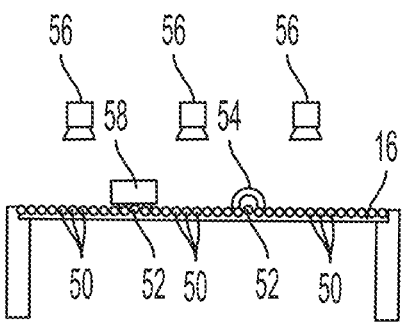
Figure 12D:
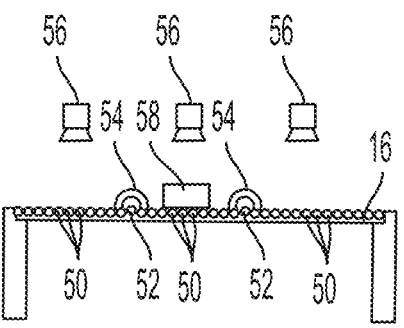

The response evaluation section 16 of FIG. 1 includes one or more transport sets of rollers 50, as well as one or more perturbation rollers 52 as shown in FIG. 11. With further reference to FIGS. 12A-12D, perception units (e.g., cameras or scanners) 54 are directed horizontally toward the conveyor section 16, and perception units (e.g., cameras or scanners) 56 are directed downward onto the conveyor section 16. When an object 58 travels along the transport rollers 30 (as shown in FIG. 12A), it will contact a perturbation roller 52 (as shown in FIG. 12B). The perturbation roller(s) 52 may be any of a larger diameter roller, or may be raised with respect to the transport rollers 50, and may be rotating at a faster rotational velocity than the transport rollers 50. FIG. 12C shows the object on a perturbation roller 52, and FIG. 12D shows the object having been discharged from the perturbation roller 52. Viewing the responsive movement of the object as it travels onto and off of the perturbation roller may provide information regarding an object's weight, composition, and balance. In this way, and using the perception units 54, 56, the system may determine (together with computer processing system 100) a wide variety of characteristics of the object 58. For example, the rollers 52 may be mounted on force torque sensors (as discussed further above), and the system may determine an estimated weight when the object 58 is determined (using the perception units 54) to be balanced on the roller 52. The roller(s) 52 on force torque sensors may therefore be used to determine an object's weight as it passes over the roller(s).

Further, if the roller(s) 52 are rotating at a faster rotational velocity, the system may determine an inertial value for the object 58 as the roller(s) engage and discharge the object from the roller(s). A wide variety of further characteristics may also be determined or estimated, such as for example, center of mass (COM) using the roller(s) in combination with the perception unit(s) as discussed herein and further below. The system may further use the perception units and roller(s) 52 (together with computer processing system 100) to determine whether the object is a collapsible bag, and/or whether the presumed object 58 is actually a plural-pick (includes more than one object), again, using the perception unit(s) in combination with the roller(s) by observing whether the objects move apart and/or whether the shape of the object changes as it rides over the roller(s) 52. In accordance with further aspects of the invention, the transport rollers 50 may be replaced by conveyor sections that stand below the height of the perturbation rollers 52.

In accordance with a further aspect, systems and methods are provided that generate informative handling parameters in semi-automated fashion. In this instance, a human personnel inspects the SKU, takes measurements such as recovering weight and product dimensions, then also provides categorical information about the SKU, and then a software system receives all this information, and then determines automation eligibility and handling parameters (using regression, machine learning, or other algorithms). The human personnel scans the item barcode so as to get the SKU, and then puts it in a weighing and dimensioning system (e.g., again a CUBISCAN® scanner as noted above). Then the human personnel tags all relevant categorical information about the SKU, characteristics such as: fragile, brittle or easily damaged (which might imply about how aggressive to move or push down on item), in a plastic bag (which might imply how quickly to move), rolls (which might roll when placed), not stackable (which might mean don't put this on the bottom of a pile), is glass (so don't handle by robot, or handle very gently), is very thin (so either don't handle if not compatible, or use special type of gripper), and opens when picked up (like a book or jeans, and so shouldn't be handled by a robot).

Figure 13:
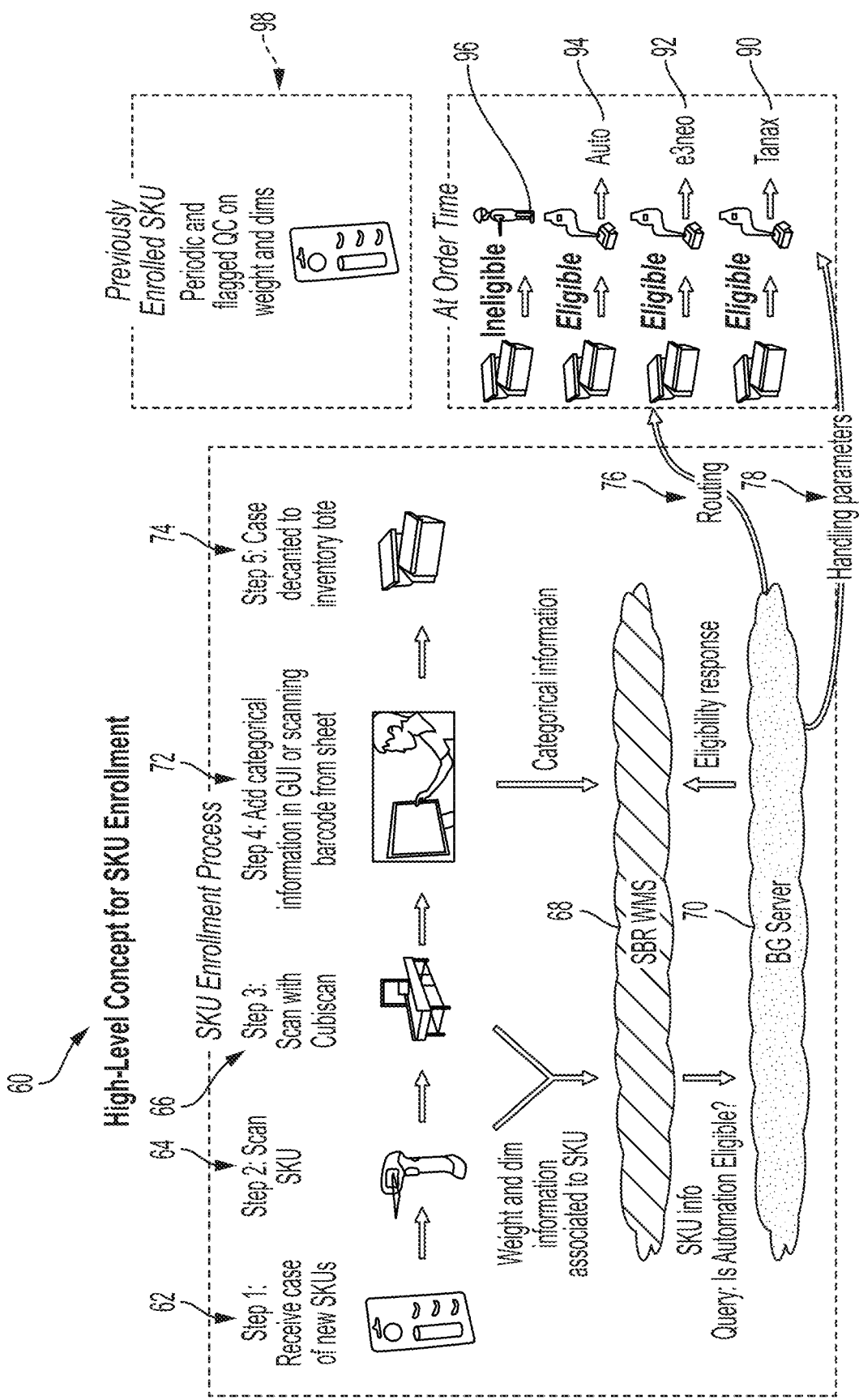
FIG. 13 shows an illustrative diagrammatic operational diagram of a system in accordance with an aspect of the present invention.

FIG. 13 for example, shows an operational diagram of a system in accordance with an aspect of the invention. As shown at 60, the process begins (shown at 62) by receiving a new case of SKUs, and then (shown at 64) scanning a SKU of the new case. The system then (shown at 66) measures weight and dimension information as discussed above (or using a CUBISCAN® scanner noted above). The weight and dimension information is then provided to a local WMS 68 as well as to a separate operational controller 70. Categorical information is then input (shown at 72) by human personnel (e.g., at an information entry system 18 of FIG. 1), and this categorical information is provided to the local WMS 68. The case is then (shown at 74) decanted to an inventory tote.

The separate operational controller 70 may then send routing instructions 76 as well as handling parameter information for the object to any of a variety of programmable motion devices 90, 92, 94 (as well as data indicating that the object is ineligible for automated handling 96). The system may also periodically flag for quality control previously enrolled SKUs to be re-weighed and analyzed for their dimensions as shown at 98.

Figure 14:
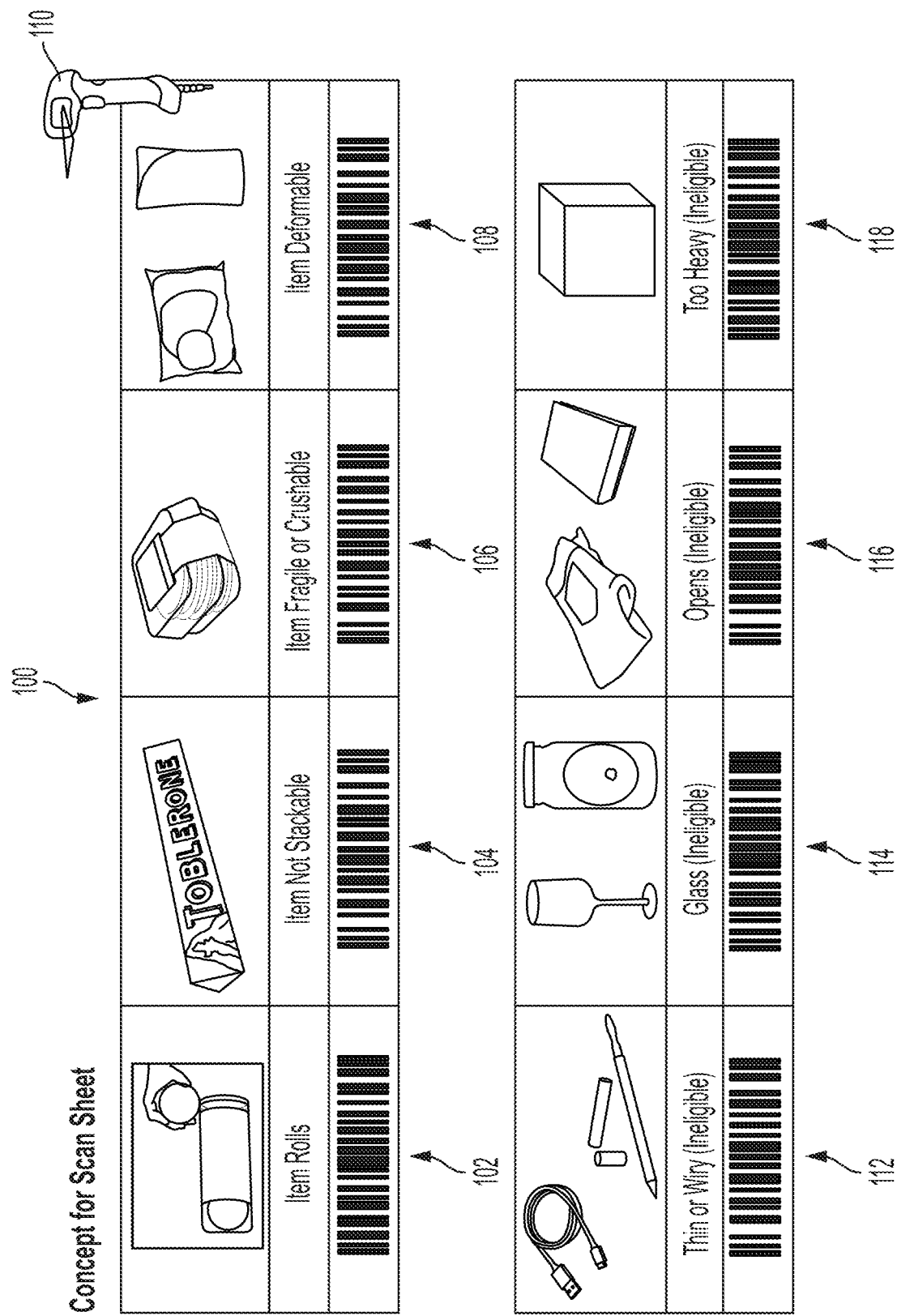
FIG. 14 shows an illustrative diagrammatic view of examples of characteristics regarding eligibility or handling parameters in a system in accordance with an aspect of the present invention.

FIG. 14 shows instances of characteristics that might be used to inform eligibility or handling parameters such as pose authority or placement authority. Pose authority is the ability to place an item into a desired position and orientation. Some items may not be easily oriented, or the resulting pose may be unpredictable. For example, an item loosely packed into a bag could crumple or fold on itself, or it may swing/pendulate uncontrollably before placement, making its resulting size and orientation unpredictable. Placement authority is the ability of an object to remain in a position and orientation at which it is placed. The information may be entered by scanning a scan sheet 100 (e.g., digitally via information entry station 18 of FIG. 1). In particular, codes on the scan sheet may be scanned (e.g., using scanner 110) following a scan of a SKU to provide information about the object. FIG. 14 shows at 102 a code that may be scanned (following a scan of the SKU) to indicate that the item may roll (has low placement authority), and shows at 104 a code that may be scanned to indicate that the item is not stackable. FIG. 14 shows at 106 a code that may be scanned to indicate that the item is fragile or crushable, and shows at 108 a code that may be scanned to indicate that the item is deformable (has low pose authority).

FIG. 14 shows at 112 a code that may be scanned (following a scan of the SKU) to indicate that the item is too thin or wiry to be reliably grasped, and shows at 114 a code that may be scanned to indicate that the item is glass or otherwise fragile. FIG. 14 shows at 116 a code that may be scanned to indicate that the item opens (has low pose authority), and shows at 118 a code that may be scanned to indicate that the item is too heavy to be processed by the automated processing system.

Figure 15:
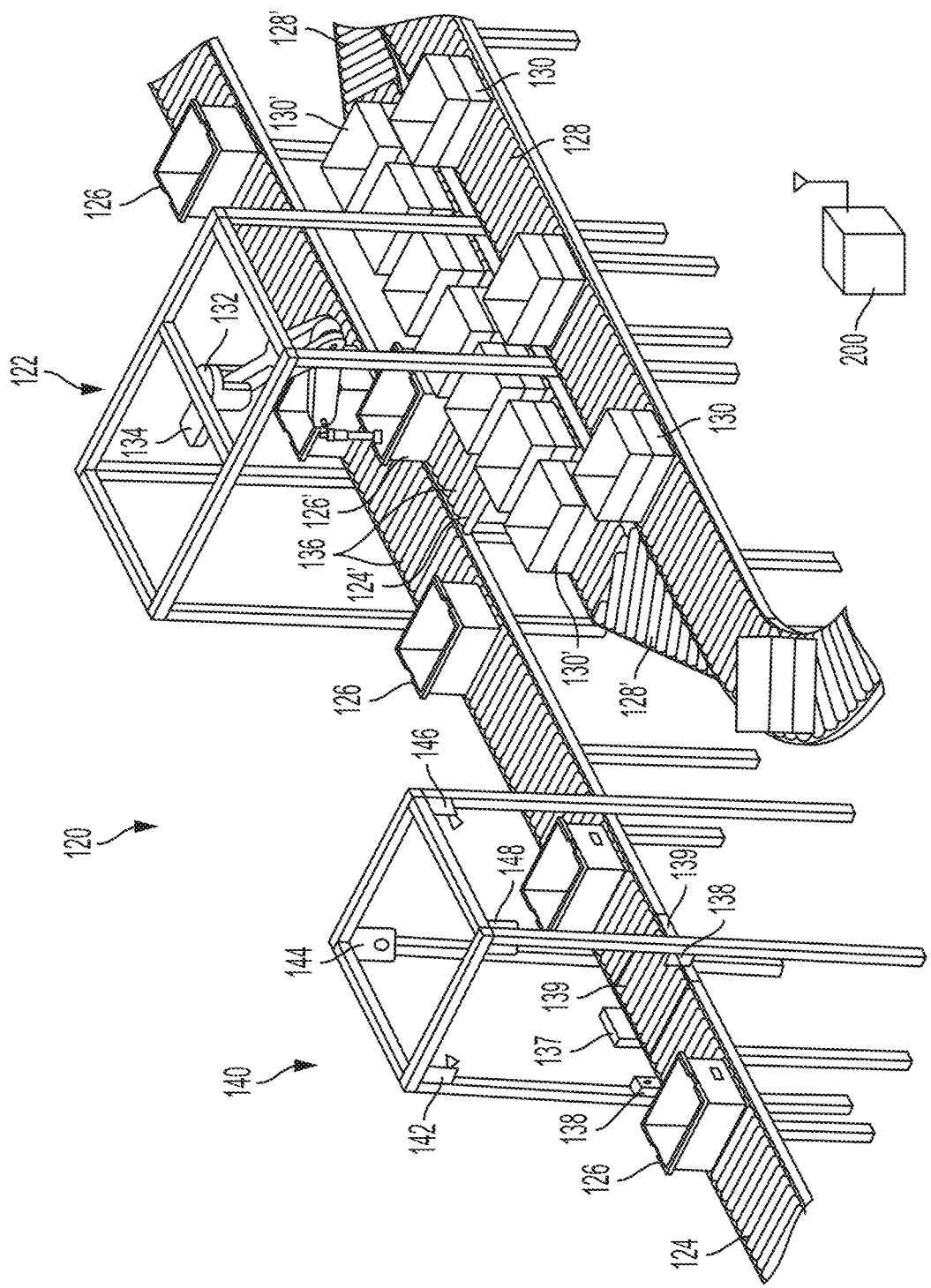
FIG. 15 shows an illustrative diagrammatic view of an object processing system including an induction in accordance with an aspect of the present invention.

The end-effector may be used with a programmable motion device in an object processing system. FIG. 15 for example, shows an object processing system 120 that includes an object processing station 122 between an infeed conveyor 124 that carries infeed bins 126, and a destination conveyor 128 that carries destination containers 130. The object processing station 122 includes a programmable motion device (e.g., an articulated arm 132) with an attached end-effector as well as an associated perception system 134. The perception system 134 is positioned to perceive objects (and/or associated indicia) in selected infeed bins 126' that are diverted (selected) by bi-directional conveyors 136 to move onto a selected infeed conveyor section 124'. The perception system 134 is positioned as well to perceive destination containers 130' that are provided on a processing destination conveyor section 128' of the destination conveyor 128, via one or more diverters that selectively divert selected destination containers 130' onto the processing destination conveyor section 128'. Operation of the system is controlled by one or more computer processing systems 200 that communicate with the conveyors 124, 124', 136, 128, 128' and the programmable motion device 132 (including the end-effector) as well as the perception system 134.

The object processing station 122 includes an infeed conveyor section 124' that circulates selected supply bins 126' from and back to the infeed conveyor 124 using the diverter bi-directional conveyors 136. The end-effector of the programmable motion device 132 is programmed to grasp an object from a supply bin 126', and move the object to deliver it to a desired destination bin 130' on the destination conveyor load area 128' by placing or dropping the object into a destination container 130' on the destination conveyor 128' at the destination conveyor load area. The supply bin 126' may then be returned to the input conveyor 124 and, optionally, brought to a further processing station. At the processing station 122 therefore, one or more vendor supply bins 126' are routed to an input area, and the programmable motion device 132 is actuated to grasp an object from a bin 126', and to place the object into a selected destination container 130'. The processed vendor bins 126' are then returned to the common input stream on the conveyor 124, and the destination container 126' is moved further along the destination conveyor 124.

The system 120 may also include one or more perception units 138 located on or near the infeed conveyor for identifying indicia on an exterior of each of the bins, providing perception data from which the contents of the bin may be identified, and then knowing its relative position on the conveyor 124, track its location. It is assumed, in accordance with an aspect, that the bins of objects are marked in one or more places on their exterior with a visually distinctive mark such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects. Based on the identified code on an infeed bin 124, the system may either permit a bin 124 to continue along the infeed conveyor 124, or may direct the selected bin 126' onto the selected infeed conveyor 124'.

On the selected infeed conveyor 124' at the object processing station 122, the perception system 134 assists (using the central control system 200—e.g., one or more computer processing systems) the programmable motion device 132 including the end-effector in locating and grasping an object in the infeed bin 126'. In accordance with further aspects, each object may also be marked with a visually distinctive mark, again such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Again, multiple symbologies or labeling approaches may be employed on each object.

The system 120 further includes a site intake perception system 140 that includes a plurality of perception units 142, 144, 146 148 that are directed downward onto the one or more objects in each infeed bin 126 on the infeed conveyor 124, as well as a weight sensing section 139 of the conveyor 124 under the perception system. Further, the weight sensing section 139 may further include a vibratory device 137 for shaking the bin in order to cause objects within the bin to spread apart from one another within the bin as discussed in more detail below. The perception system is mounted above the conveyor into each bin of objects to be processed next looking down into each bin 126. The perception units, for example, may include, a camera, a depth sensor and lights. A combination of 2D and 3D (depth) data is acquired. The depth sensor may provide depth information that may be used together with the camera image data to determine depth information regarding the various objects in view. The lights may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 16A:
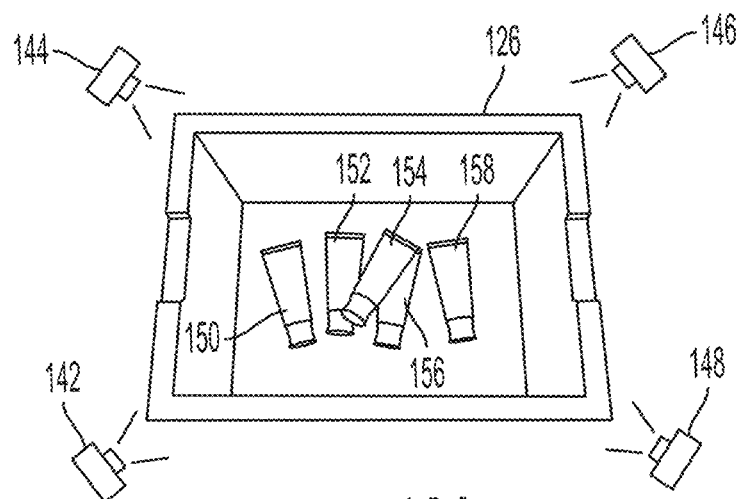
FIGS. 16A-16C show illustrative diagrammatic views of a view of a bin in accordance with an aspect of the present invention, showing a camera view (FIG. 16A), a volumetric scan of the bin (FIG. 16B), and a 3-D scan using edge detection (FIG. 16C)

FIG. 16A shows a view of the bin 126 from the perception system 140, which includes perception units 142, 144, 146 and 148. The image view of FIG. 16A shows the bin 126 (e.g., on the conveyor 124), and the bin 126 contains objects 150, 152, 154, 156, 158. While in certain systems, the objects in each infeed bin may be non-homogenous (multiple SKUs), in other systems, such as shown in FIG. 16A, the objects may be homogenous (single SKU). The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

Figure 16B:
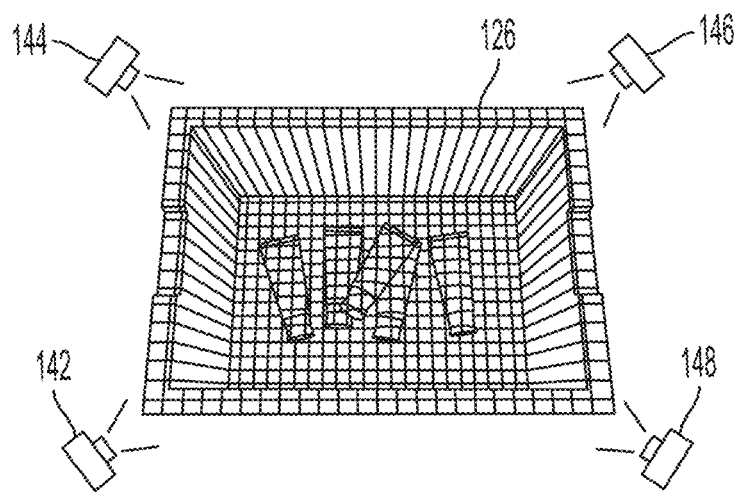

The perception system 140 includes among the perception units 142-148 scanning and receiving units as well as edge detection units for capturing a variety of characteristics of a selected object of the whole bin. Again, FIG. 16A shows a view from the capture system, which in accordance with an embodiment, may include a set of similar or similar objects 150, 152, 154, 156, 158. The difference in volume (if any) as scanned is shown in FIG. 16B and compared with recorded data regarding the item that is identified by the identifying indicia as provided by the detection system of the SKU induction system or the recorded object data. In particular, the scanned volume is compared with a volume of the identified SKU multiplied by the number of objects known to be in the bin.

In accordance with further aspects, the scanning and receiving units may also be employed to determine a density of the collection of objects in the bin, which is compared with a known density of the identified SKU multiplied by the known number of objects in the bin from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

Figure 16C:
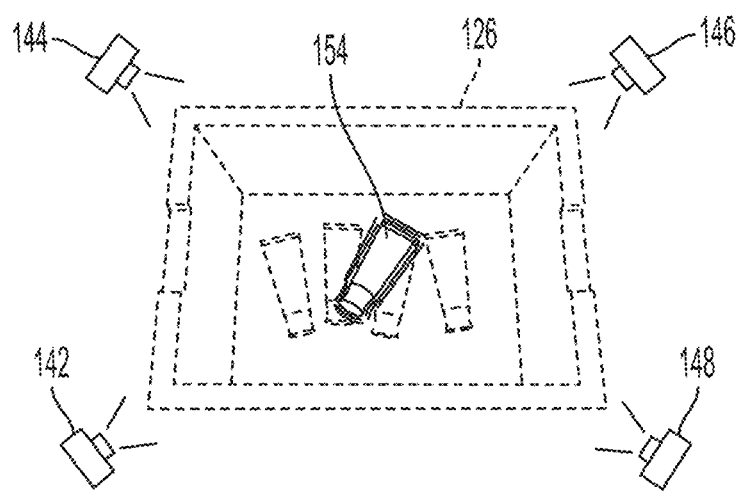

In accordance with further aspects, the system may additionally employ edge detection sensors that are employed (again together with the processing system 200), to detect edges of any objects in a bin, for example using data regarding any of intensity, shadow detection, or echo detection etc., and may be employed for example, to determine any of size, shape and/or contours as shown in FIG. 16C to aid in confirming a number of objects in the bin. In certain aspects, the system may identify a specific object in the bin and confirm its shape and size through such edge detection. The above system therefore, may be used to confirm a number of objects in a bin, and in certain aspects, to originally estimate a number of (single SKU) objects in a bin, and/or confirm the recorded data for any particular SKU.

Again, the operations of the system described above are coordinated with a central control system 200 that again communicates (e.g., wirelessly) with the articulated arm 132, the perception systems 134, 138, 140, as well as in-feed conveyors 124, 124', bi-directional conveyors 136, destination conveyors 128, 128' and any diverters. This system determines from symbol strings the UPC associated with a vendor bin, as well as the outbound destination for each object. The central control system 200 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 17:
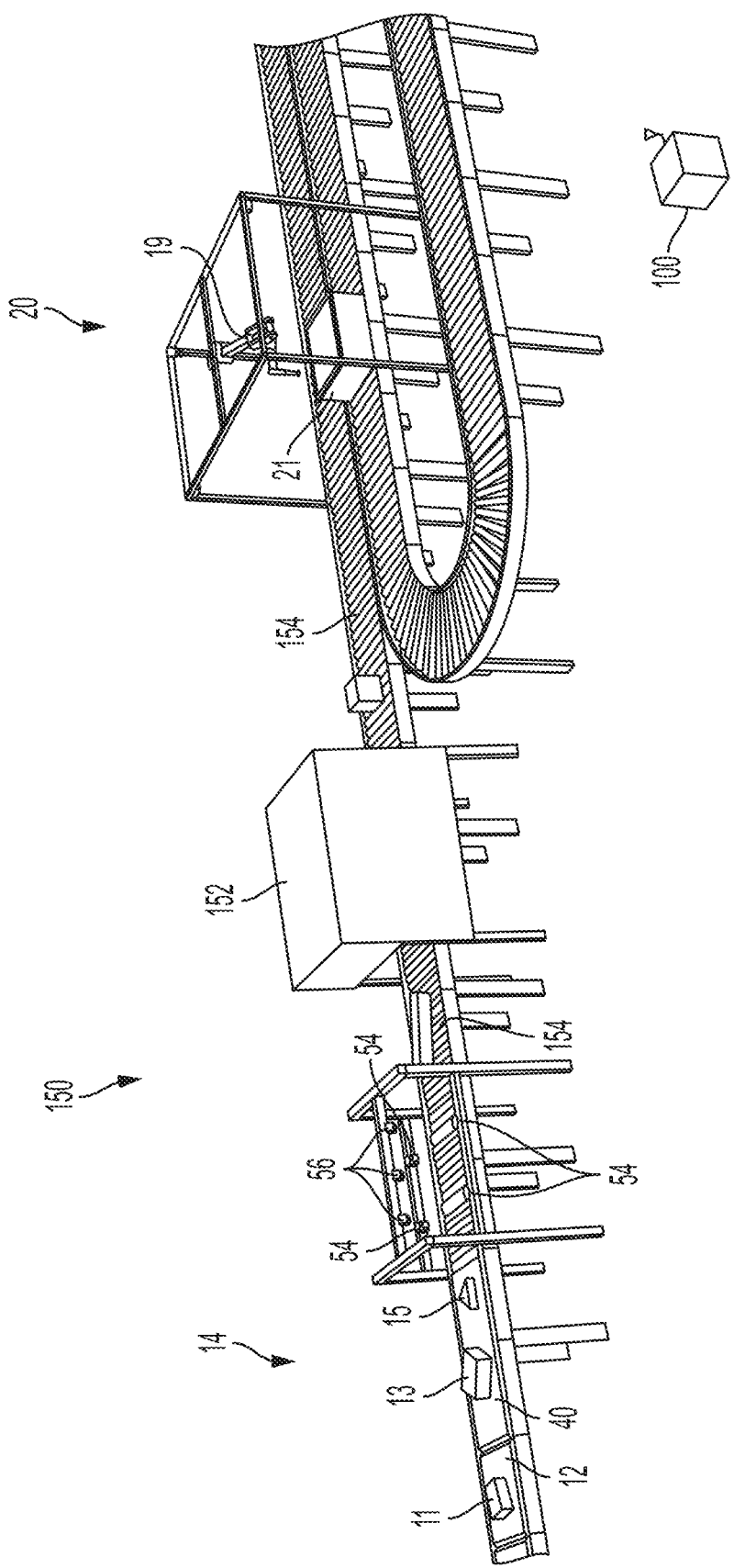
FIG. 17 shows an illustrative diagrammatic view of an induction system including an enclosed scanning system in accordance with a further aspect of the present invention.

FIG. 17 shows a SKU induction system 150 in accordance with another aspect of the present invention that includes an input station 14 as discussed above with reference to FIG. 1 to which new objects 11, 13, 15 are presented, for example, in a singulated stream on conveyor 40. The objects may be provided from a case of homogenous or non-homogenous objects, where one object at a time is presented for induction into the processing system. Again, any of the conveyors may be cleated or non-cleated, and the systems may monitor and control movement of the conveyors via speed controls. The induction system 150 includes a weight sensing conveyor section 12 as discussed above, a response evaluation system 16 as discussed above, and a bin preparation system 20 all as discussed above, e.g., including a programmable motion device 19 for placing objects into bins 21 for processing by the object processing system. The induction system 150 further includes an enclosed scanning system 152 through which a conveyor 154 carries objects en route to the bin preparation system 20.

Figure 18:
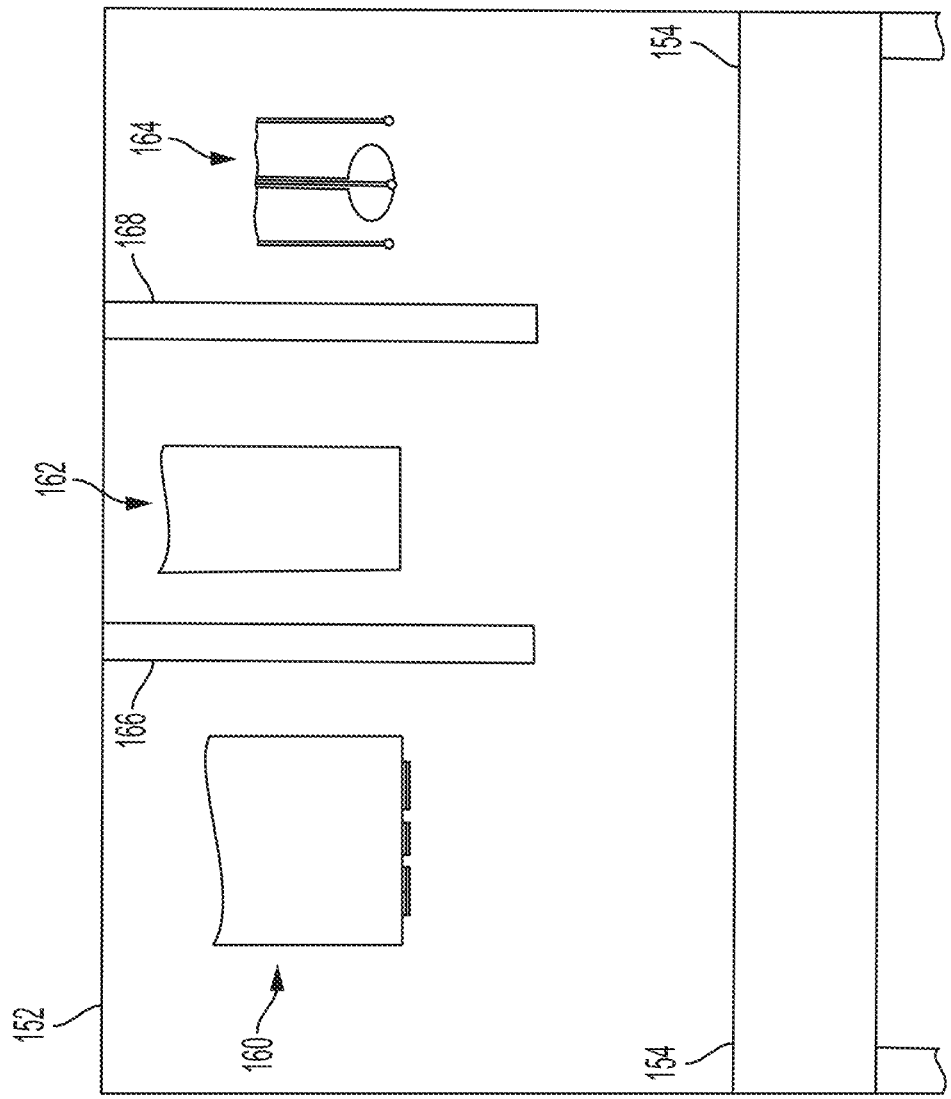
FIG. 18 shows an illustrative diagrammatic side view of the enclosed scanning system of FIG. 17 (with a portion of the enclosure removed for clarity)

With reference to FIG. 18, the enclosed scanning system 152 may include a plurality of scanning systems 160, 162, 164, for example, that scan objects as they pass through the system 152. The scanning systems 160, 162, 164 may be timed to operate at different times, and may be separated by isolators 166, 168, and may further in certain aspects, be enclosed in separate enclosures.

Figure 19:
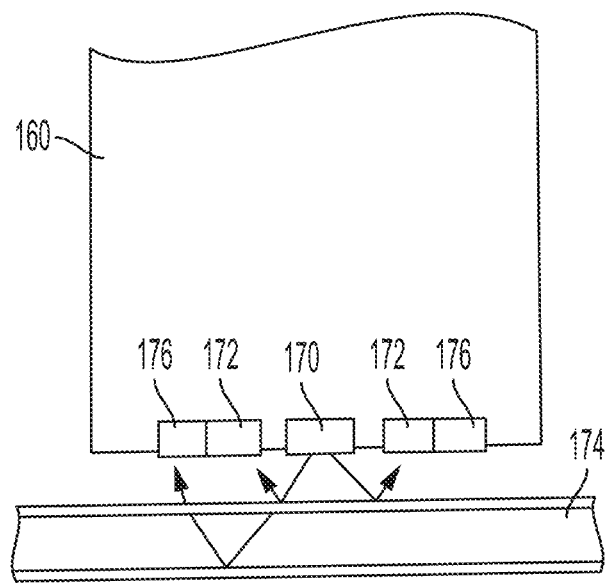
FIG. 19 shows an illustrative diagrammatic side view of a multi-frequency inspection station in the enclosed scanning system of FIG. 17.
Figure 20:
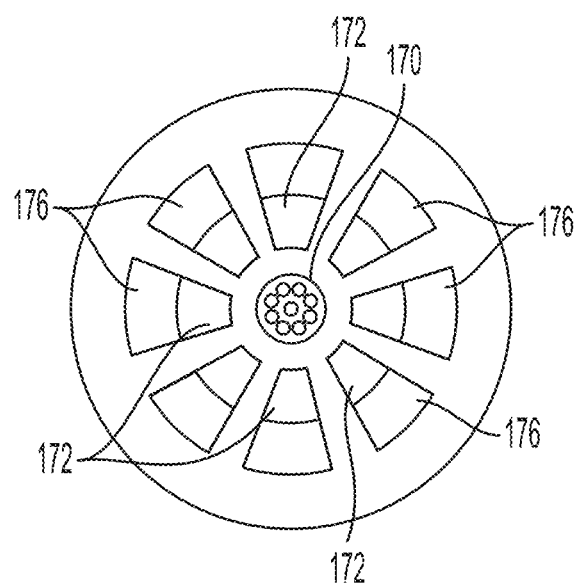
FIG. 20 shows an illustrative diagrammatic bottom view of the multi-frequency inspection station of FIG. 19.

With further reference to FIGS. 19 and 20, the system 160 may include a plurality of light sources 170 (e.g., laser sources of different frequencies). Illumination reflecting off of a (highly reflective) surface of an object 174 may be immediately returned to close sensor 172, while illumination that passes into and is returned from the object 174 may be returned to a more radially distal sensor 176. The system 160 may learn responses of different types of plastics (e.g., bags) at different frequencies to determine a variety of characteristics of the material of the object, including, for example, reflectivity at difference wavelengths and indices of refraction. Additionally, the system employs light sources of not only a variety of wavelengths, but also infrared or ultraviolet radiation as well.

Figure 21B:
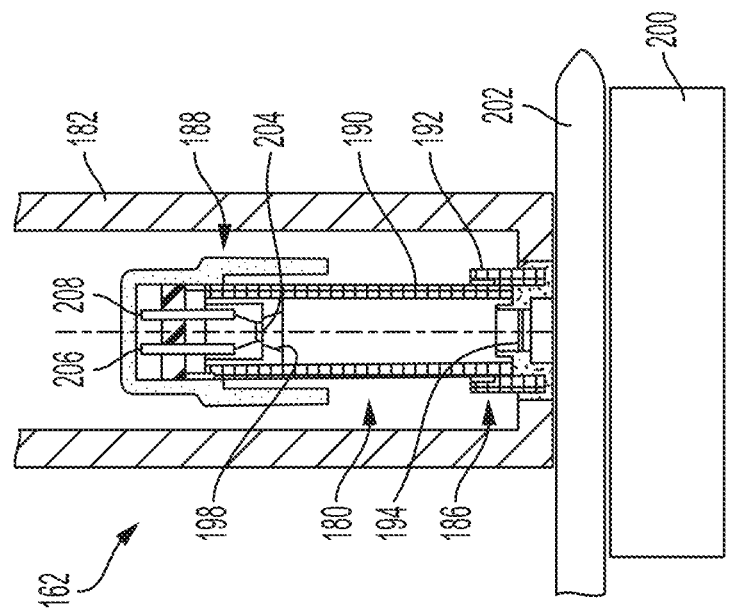
FIGS. 21A and 21B show side sectional views of a low-voltage x-ray scanning system of the enclosed scanning system of FIG. 19.
Figure 21A:
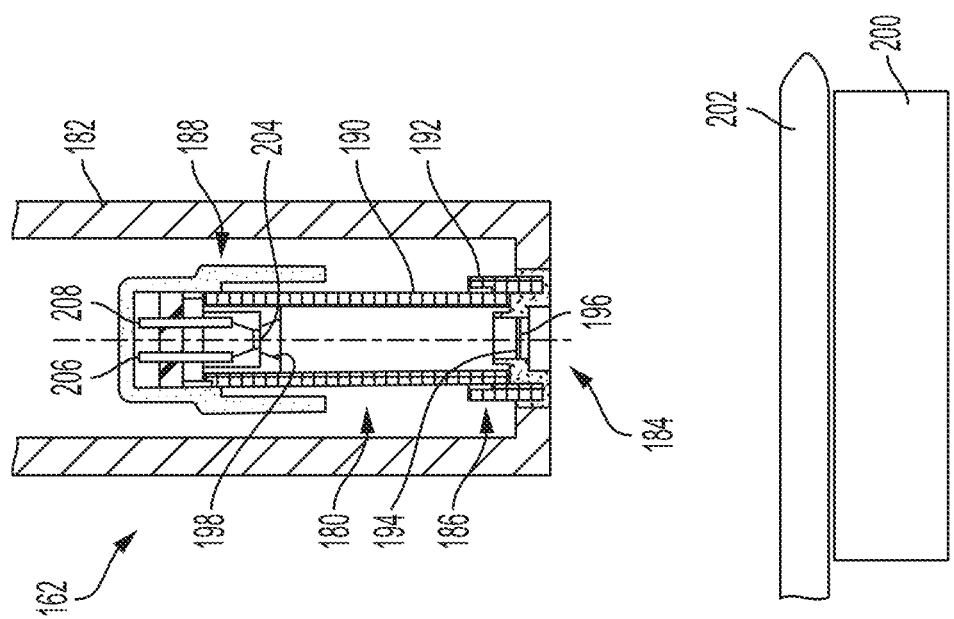

FIGS. 21A and 21B show the scanning system 162 that includes a portion of an x-ray source that may include an x-ray tube 180 within a housing 182 such that x-rays may be emitted by the x-ray tube through an x-ray output region 184 of the housing 182. The x-ray tube includes an anode end 186, a cathode end 188, and an intermediate section 190 between the anode end 186 and the cathode end 188. The anode end 186 of the x-ray tube 10 includes an anode hood 192, an x-ray producing target 194, and an x-ray transmissive window 196. The cathode end 188 includes a cathode shroud 198, an electron emitter 204, and electrical connections 206 and 208 by which heater power is applied to the electron emitter 204. The intermediate section 190 may be formed of an electrical insulator such as ceramic or glass. The electrical insulator is sealed to the anode and cathode ends of the x-ray tube, thereby producing an interior region of the x-ray tube in which a vacuum can be produced and maintained.

The scanning system 162 is positioned above a detector 200, and an object 202 (such as a portion, e.g., edge or corner, of a shipping bag) may be positioned over the detector 200. When the scanning system 162 is positioned adjacent the object 202, the x-ray scanner is engaged, and heater power is supplied to the cathode electron emitter 204. A high voltage (e.g., 30-50 kV) is thereby applied between the cathode end 188 and the anode end 186. The electric field produced by the applied high voltage accelerates electrons from the electron emitter through the vacuum to the x-ray producing target 194. The intensity of the x-rays produced at the target increases with increasing high voltage, electron beam current, and atomic weight of the target material. A portion of the x-rays produced in the target exit the tube via the x-ray transmission window 196, and exit the housing 182 via the x-ray output region 184 of the housing 182. The high voltage at the cathode end is typically provided as a negative high voltage (e.g., −50 kV) and the voltage potential at the anode end is typically provided at a reference ground potential of the system. This permits the anode end 186 of the tube 180 to be coupled directly to the housing 182. The x-ray tube 180 may be packaged in a reciprocating device that includes a high voltage power supply and a power source to drive the electron emitter.

Depending on the power level adjustments, the scanning system 162 may be used to determine any of materials and density of both the shipping bag and/or any contents. For example, the system 162 may be used in certain embodiments to distinguish between low density polyethylene (0.917-0930 g/cm$^3$) and high density polyethylene (0.944-0.065 g/cm$^3$). Such a system may also be used to determine whether a density of an object is too great for an articulated arm to be able to safely lift or move the object, or in other aspects to determine comparative responses to a variety of known materials for machine learning purposes.

Figure 22:
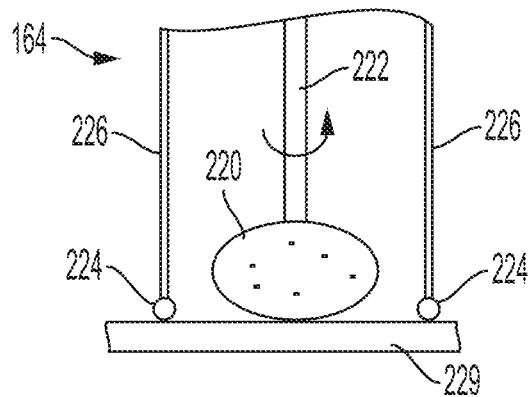
FIG. 22 shows an illustrative diagrammatic side view of a triboelectric scanning system of the enclosed scanning system of FIG. 19 with a negatively charged probe.
Figure 23:
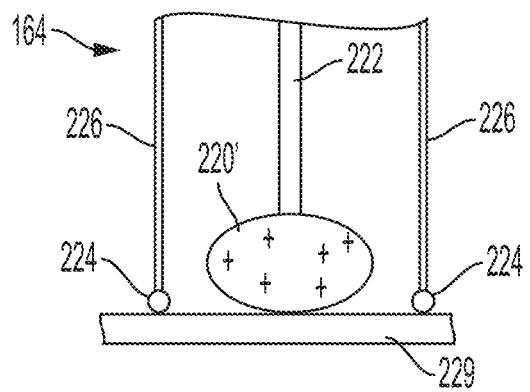
FIG. 23 shows an illustrative diagrammatic side view of a triboelectric scanning system of the enclosed scanning system of FIG. 19 with a positively charged probe.
Figure 24:
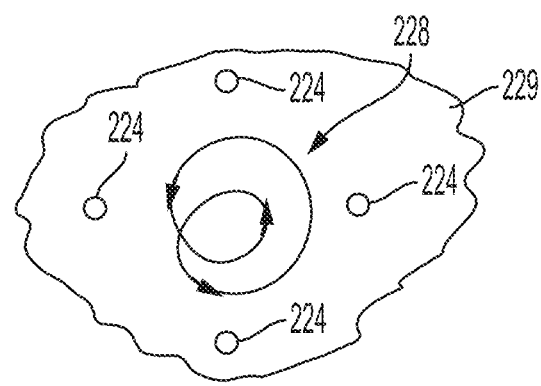
FIG. 24 shows an illustrative diagrammatic plan view of probe movement in the triboelectric scanning system of FIG. 19.

The scanning system 164 is shown in FIGS. 22-24, which includes a triboelectric scanning system that includes a charged rubbing probe 220 that is attached to a movable shaft 222. As shown in FIG. 22, the probe 220 may be negatively charged, and as shown in FIG. 23, the probe 220' may be positively charged in accordance with different aspects of the invention. The system 164 further includes one or more (e.g., four as shown in FIG. 24) detection probes 224 on elongated conductive rods 226. When the probe 220, 220' is placed on a surface of an object 229 as shown in the top view of FIG. 24, the probe 220, 220' is moved (e.g., in a looping motion that brings it near and away from various detection probes 224, any detected positive or negative charge (electron loss or electron gain) is detected by one or more of the detection probes 224. Since different materials behave differently to the present or absence of additional electrons, differentiation of materials may be determined. For example, it is known that materials (e.g., plastic materials), become more negatively charged along the list of acrylic, polystyrene, polyurethane, polyethylene, polypropylene, vinyl. Again, using machine learning, the responses of different materials to the probe 220 and/or 220' may be correlated with later learned or known material responses to facilitate identifying the material of the object or object's shipping packaging.

Figure 25A:
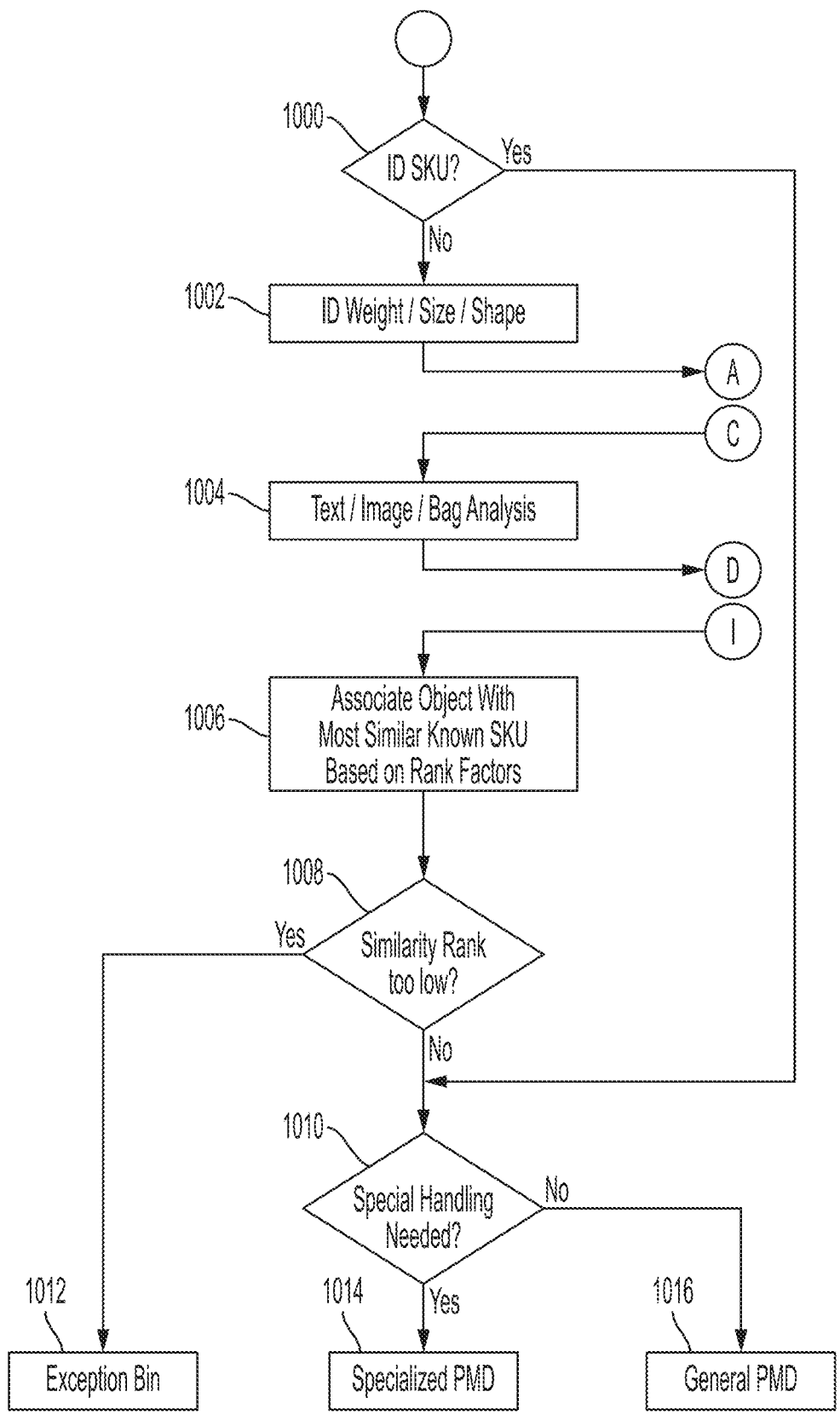
FIGS. 25A-25H shows illustrative diagrammatic views of a SKU induction processing system in accordance with an aspect of the present invention.
Figure 25B:
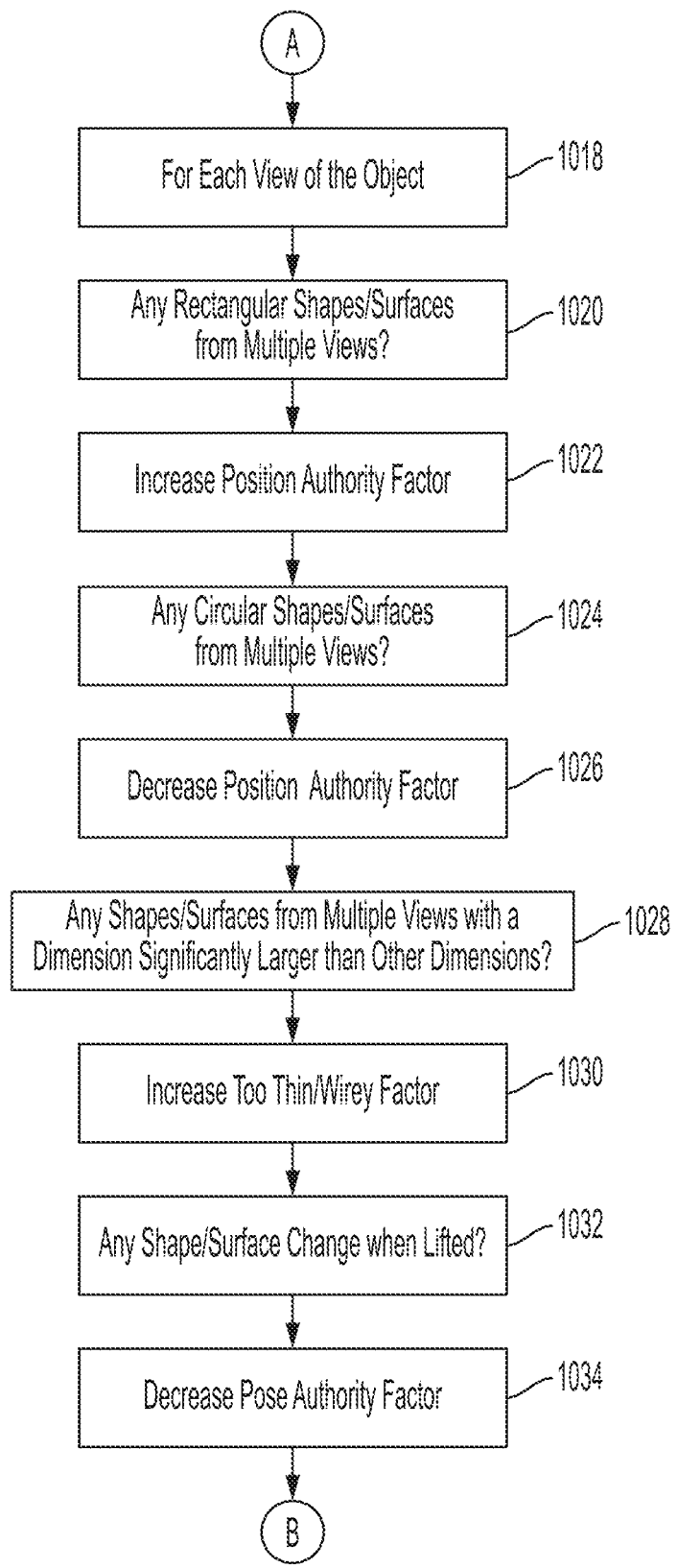
Figure 25C:
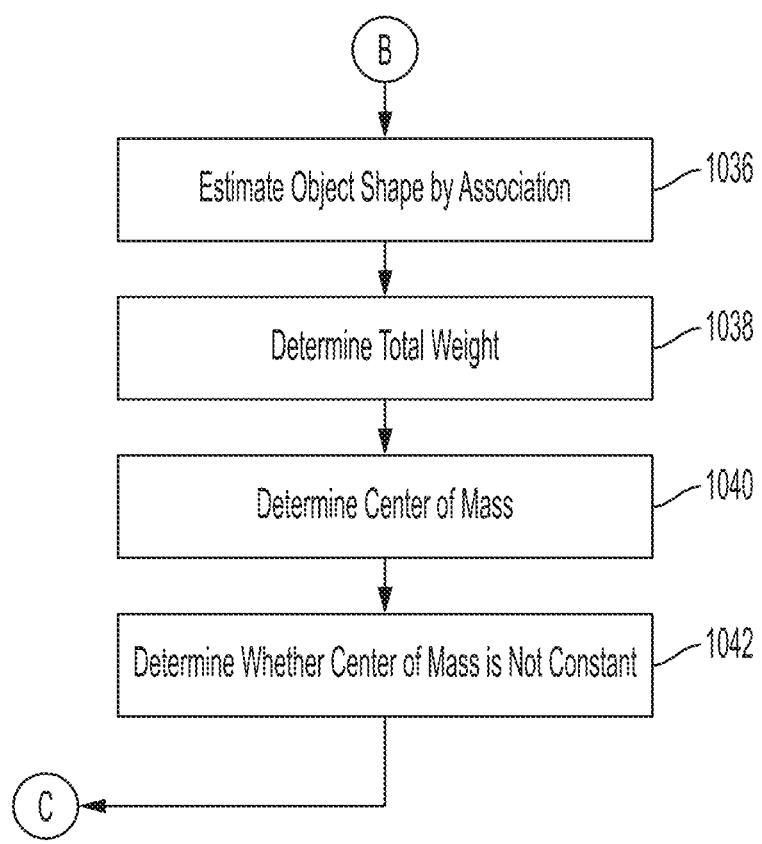

With reference to FIGS. 25A-25H, a process for providing SKU induction in accordance with an aspect may involve processing an object if the SKU of the object is identified, and such processing may involve identifying whether the SKU requires any special handling by a specialized programmable motion device, or whether the SKU may be handled by a general programmable motion device. With reference to FIG. 25A, the process may begin therefore, by determining whether a SKU is identified (step 1000). If the SKU is not known, the system may seek to ID the object's weight, size and/or shape (step 1002), and with reference to FIG. 25B, may seek to determine (e.g., from each view of the object with reference to step 1018)), characteristics regarding different surfaces and/or views of the object. For example, the system may determine whether any of the shapes or surfaces from each view includes a rectangular shape (step 1020), and if so, a position authority (ability to stay in position when placed) factor would be increased (step 1022). The system may also determine whether any of the shapes or surfaces from each view includes a circular or rounded surface (step 1024), and if so, the position authority factor would be reduced (step 1026). Further, the system may determine whether any of the shapes or surfaces from each view includes a shape that has a dimension that is significantly larger than other dimensions (step 1028), and if so, the system may increase a factor that relates to whether an object is too thin or wiry to be processed (step 1030). Additionally, the system may determine whether any shape or surface of an object changes significantly when lifted (step 1032), and if so, a pose authority (ability to stay in position when gasped) factor would be decreased (step 1034). With further reference to FIG. 25C, the system may then use the above information to estimate an object's shape by association with other known SKUs (step 1036), may determine the object's weight (step 1038) and center of mass (step 1040), and may determine whether an object's center of mass is not constant (step 1042), for example, if the object is not stable.

Figure 25D:
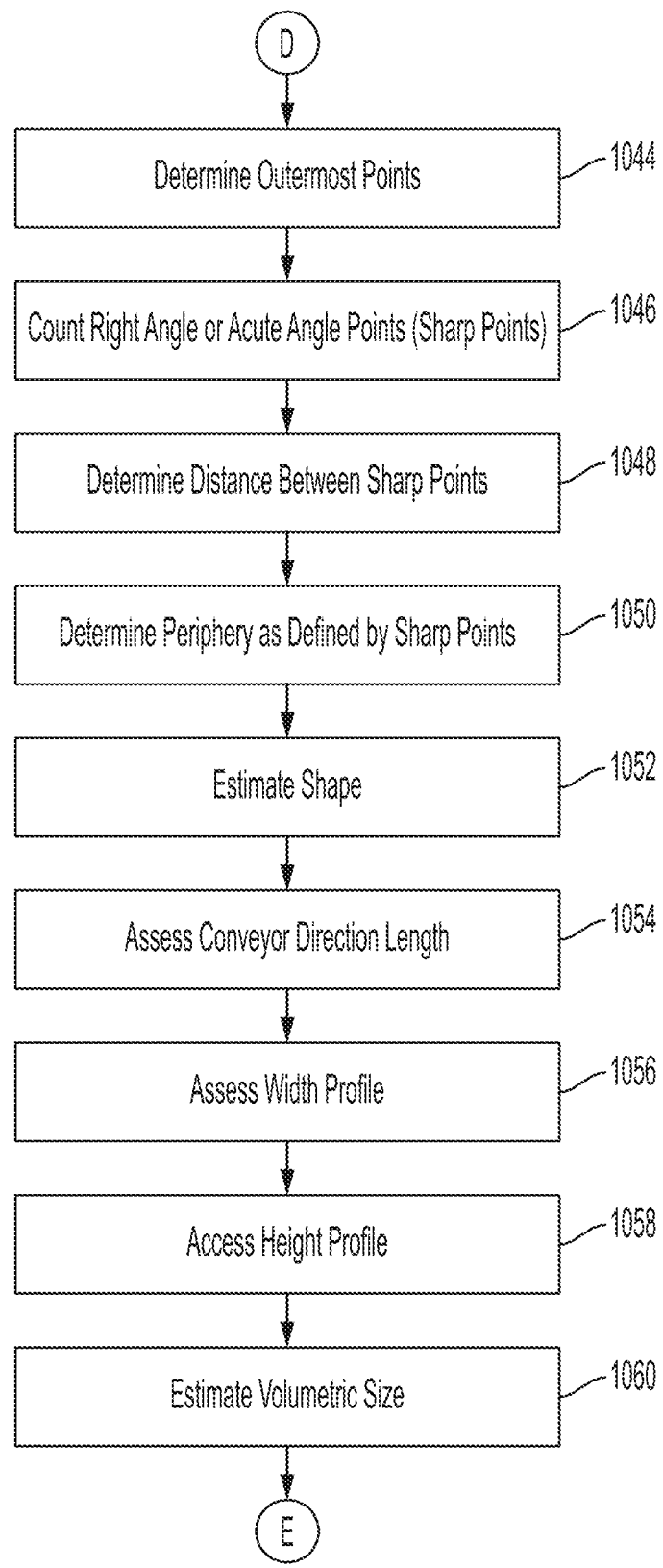

The system may then return to a text/image/bag analysis routine (step 1004) in FIG. 25A, and then analyze the object packaging as follows and with reference to FIG. 25D. The system may determine outermost points of the object (step 1044), and then determine which points form right or acute angle points (step 1046). The distance between such points is then determined (step 1048), and a periphery is the estimated (step 1052), which is used to estimate the object's shape (step 1052). A length profile along the conveyor direction is then assessed (step 1054), a width profile is assessed (step 1056), and a height profile is then assessed (step 1058), and this information may be used to estimate a volumetric size of the object (step 1060).

Figure 25E:
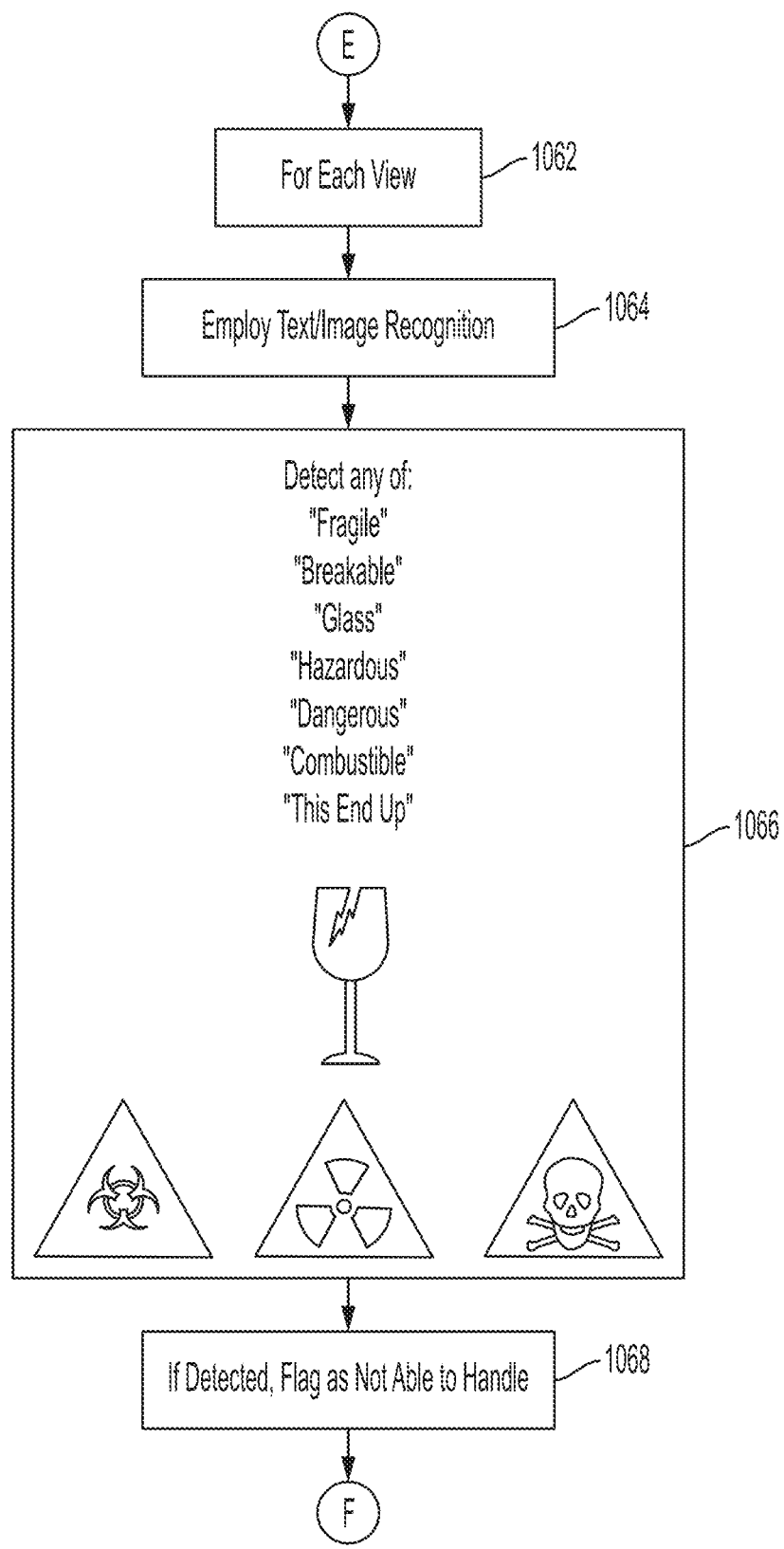

Further, and with reference to FIG. 25E, for each view (step 1062), the system will employ text and image recognition (step 1064) to detect any of the words "fragile", "breakable", "glass", "hazardous", "dangerous", "combustible", and "this end up" (step 1066). If any of these terms are found, the system will identify the object as not being processible by the programmable motion devices (step 1068), and such object will be routed to an exception bin. The system may also detect any of a variety of images that may also indicate that the object is any of fragile or contains harmful material as shown in FIG. 25E. If any of these is found on the object, the object is flagged as not suitable for processing by programmable motion devices.

Figure 25F:
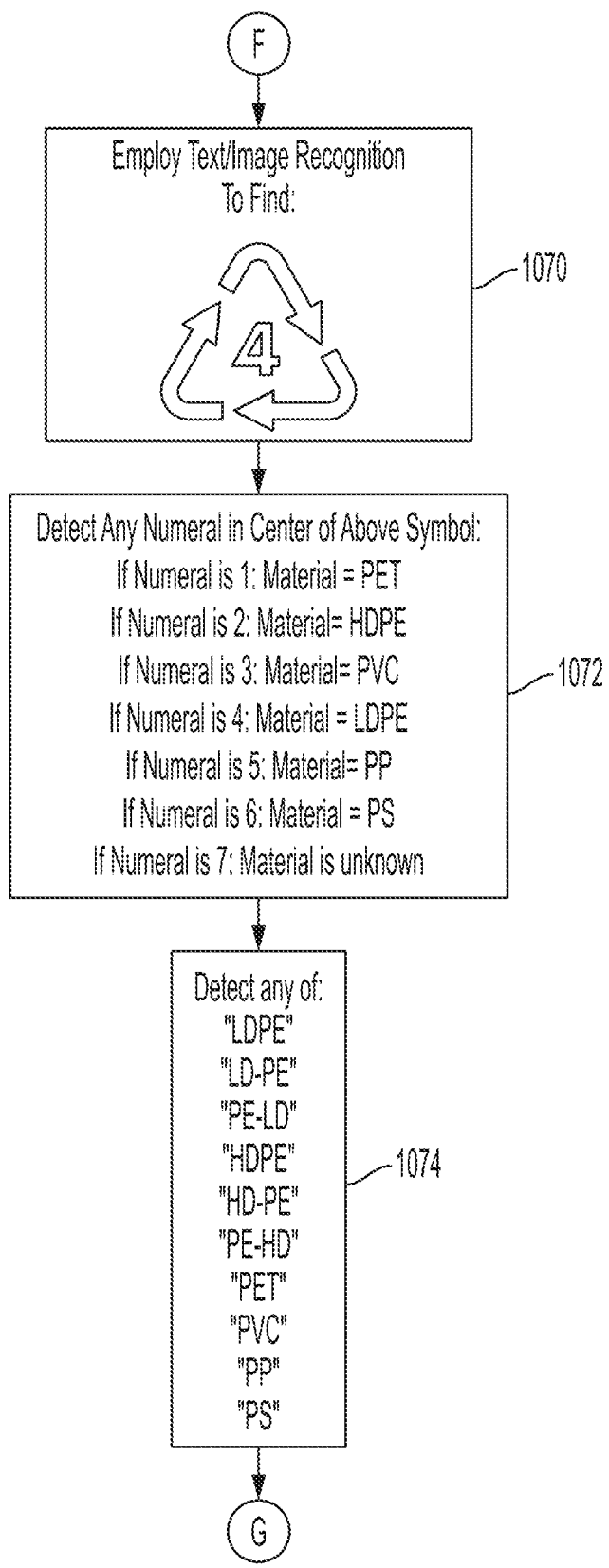
Figure 25G:
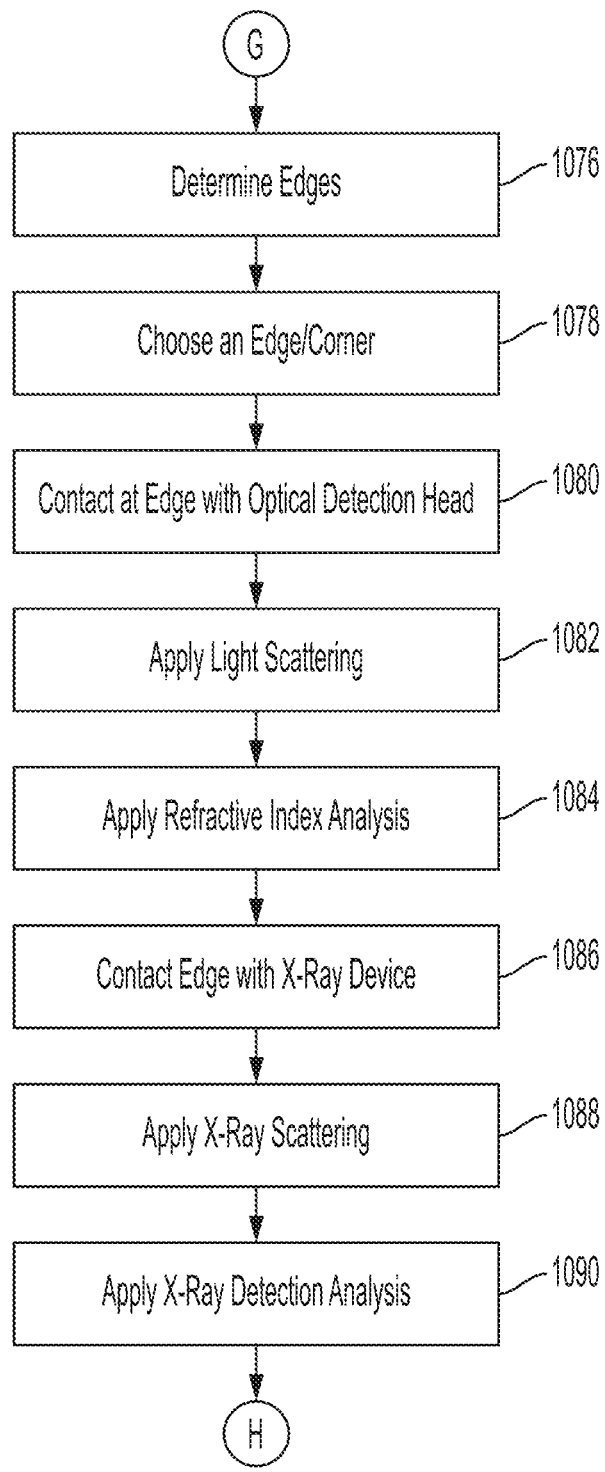
Figure 25H:
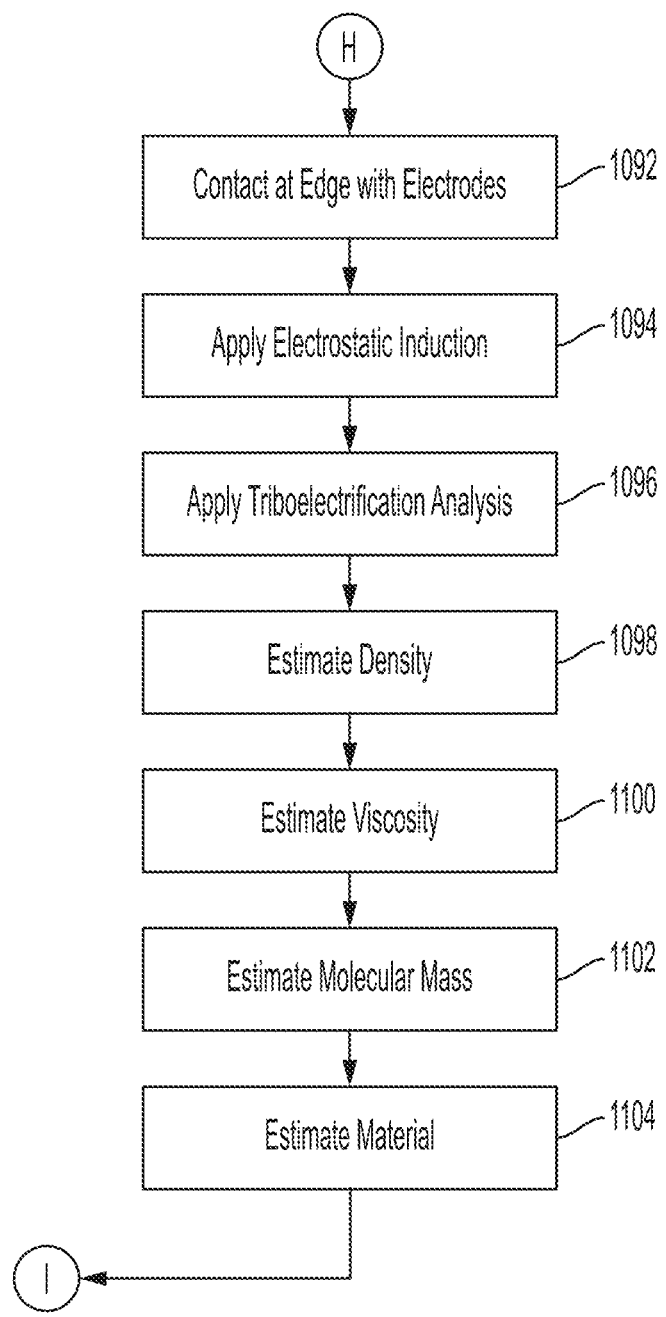

Additionally, and with reference to FIG. 25F, the system may employ a combination of image and text recognition (step 1070) to first identify a plastics recycling symbol as well as a numeral therein. As the numeral identifies the type of plastic, the system will make the following associations (step 1072): if the numeral is 1, then the material=polyethylene terephthalate (PET), if the numeral is 2, then the material=high density polyethylene (HDPE), if the numeral is 3, then the material=polyvinyl chloride (PVC), if the numeral is 4, then the material=low density polyethylene (LDPE), if the numeral is 5, then the material=polypropylene (PP), if the numeral is 6, then the material=polystyrene (PS), and if the numeral is 7, then the material remains unknown. The system will also search of any of the terms: "LDPE", "LD-PE", "PE-LD", "HDPE", "HD-PE", "PE-HD", "PET", "PVC", "PP", and "PS" (step 1074).

The system may then (and with reference to FIGS. 17-24, 25G and 25H) determine edges of the object (step 1076) and choose an edge for analyses (step 1078). An optical detection head may then be used to interrogate the object (step 1080) as discussed above, e.g., using infrared, visible or ultraviolet radiation (step 1082). A variety of analyses may be performed, including light scattering and refractive index analysis (step 1084).

The system may then employ x-ray analysis of edges (step 1086), x-ray scattering (step 1088), and apply x-ray detection analysis (step 1090) to characterize any scattering or transmission detection to further characterize the object. The system may also (and with reference to FIG. 25H), make contact with electrodes (step 1092) then employ electrostatic induction analysis (step 1094) to determine a triboelectric response (step 1096) to the application of (or absence of) electrons on the surface of the material. The system may then estimate any of the object's density (step 1098), viscosity (step 1100), molecular mass (step 1102) and material composition (step 1104). With reference again to FIG. 25A, the system may then associate the object with a similar or most similar SKU based on rank factors (step 1006), and determine whether a similarity rank to a next closest object is sufficiently high (step 1008) to process the new SKU. If the similarity ranking is too low, the system will divert the object an exceptions bin (step 1012). If the object is to be processed, the system will determine whether any special handling needs to occur (step 1010). If so, the object is processed with special handling (step 1014), and if not the object is processed with a general programmable motion device (step 1016).

In accordance with further aspects, the invention provides strategies for decanting by robot, automated system or human personnel, in order to improve picking performance. Decanting is the operation of transferring units that arrive in a case, to a tote; the tote then gets forwarded to one or more robot cells directly, or is the storage unit for an automated storage and retrieval system (AS/RS). The performance of the robot cell can depend on the organization of objects inside the tote. If the objects are neatly tiled and adjacent to one another, then it can be difficult for grasp detection algorithms to generate a pick that picks only one item. For example, if the system captures a picture of tote from above, then chooses where to draw circle (for where the suction cup goes), then the chances that the circle contains two objects may be high (and thereby result in a plural-pick). In accordance with various aspects therefore, the robotic or automated decanting station, or station for improving pickability might, for example, shake the tote to reduce the effects of tiling, and to, for example, spread out the objects in the tote to help the robot make better grasp decisions. In accordance with various further aspects, human personnel may select some grasp points on an image to help train the robot as disclosed, for example, in U.S. Pat. No. 10,625,432, the disclosure of which is hereby incorporated by reference in its entirety.

In accordance with further aspects, multiple special induction systems for SKU tuning may be provided similar to the SKU induction system 10 of FIG. 1. Different induction systems are specialized to handle different types of SKUs. For example, SKUs that will require extra work (e.g., due to its size, low pose authority or low placement authority). Other SKUs are decanted at faster SKU induction systems. In further aspects, in order to provide information to human personnel that may aid in such differentiation, systems of an aspect of the invention may document via photos objects and successful and non-successful decanted totes. In accordance with further aspects, the system may provide heat-maps of successful picks to the decanter to help the system make orientation decisions- and to permit human personnel to show grasp points that the robot can later use. The system may also provide instructions on optimal decanting or picking for the robot presented to the user on screen, which may be SKU-dependent. In accordance with other aspects, the system may detect with a camera whether the object was processed correctly, and/or project instructions into the workspace, for example, providing cutting locations projected on a box to be decanted. In accordance with further aspects, human personnel are evaluated by their rate as well as the number of pick failures the robot had on their tote, and are therefore incentivized to decant in a manner that is good for the robot, and not just faster for the person.

In accordance with further aspects, the system may provide sub-optimal picking performance or characteristics about the SKU that don't match information in the database, and automatically tags the SKU or tote to be routed to QA stations. This may be done where the operational controller 70 detects suspicious data and asks human personnel to weigh or measure an object (SKU) either using the system disclosed above or a CUBISCAN® scanner noted above that is in communication with the station for use. In accordance with further aspects, human personnel may categorize a menu of packaging types, or other items used in compatibility such as employing a crush factor, which is a measure of susceptibility of an object being crushed.

In accordance with further aspects, the system may evaluate tote features that would improve picking performance. For example, the system may note tote color or texture, e.g. so that the bottom of the tote has a known texture or background. The color (e.g., of a background or inner surface) of a tote may be used for identification purposes such as classifying a tote, or may provide a known background against which objects may be more readily identified. Further, a textured inner surface (e.g., wavy) may provide a non-flat bottom to aid in picking, and/or may include a shape (e.g., inserts) that keep items away from the edges, providing a more bowl shape again to aid in picking. In accordance with further aspects, the system may provide totes with holes and push blades that can push objects within the tote to aid in picking.

In accordance with further aspects, the system may provide feedback for informing a supply chain of better packaging options. Some of this information could be used to provide an automated what-if recommendation for vendor feedback. Human personnel would take a photograph of an example of bad packaging to generate report to be sent back to vendors. Also, the system may generate grasps from the photo to let the associate see what grasps would look like.

Parameter estimation may also be conducted throughout the induction processing, for example, during training and scoring modes. The scoring mode uses the current handling parameter estimation models to generate planning parameters for a single SKU or a set of SKUs. An estimator application will be called by product manager upon receiving new or updated SKU data.

The training mode will have the following functionality: training of parameter estimation models, offline evaluation of newly training model (see below), comparison of offline performance of the new model with the one of production model and decision if the new model is promoted to production, and generation of planning parameters for all SKUs in Product collection in data storage.

The data storage will store a separate test set of experiments with the known numbers of drops, plural-picks and damages. In this set each test SKU will have experiments with multiple cup sizes and multiple scale durations. This test set will be a subset of damage and 24/7 experiments. A model (production one or newly trained one) will choose for each test SKU the best parameters among those that have experiments in the test set. Then a training application will count the number of bad events generated by the chosen parameters.

For each SKU in the Product collection, the data storage will store two sets of planning parameters, one for induction and single-pick cells, and the other one for plural-pick cells. A large database will also store two serialized models, one for induction and single-pick cells, and the other one for plural-pick cells. The training will run both on-demand and periodically, for example after uploading a new training data to data storage, human personnel will be able to launch a training process (both data upload and launch of training will be done through training application console). Additionally, the training may be registered as a scheduled job and will run for example, once a week.

Figure 26:
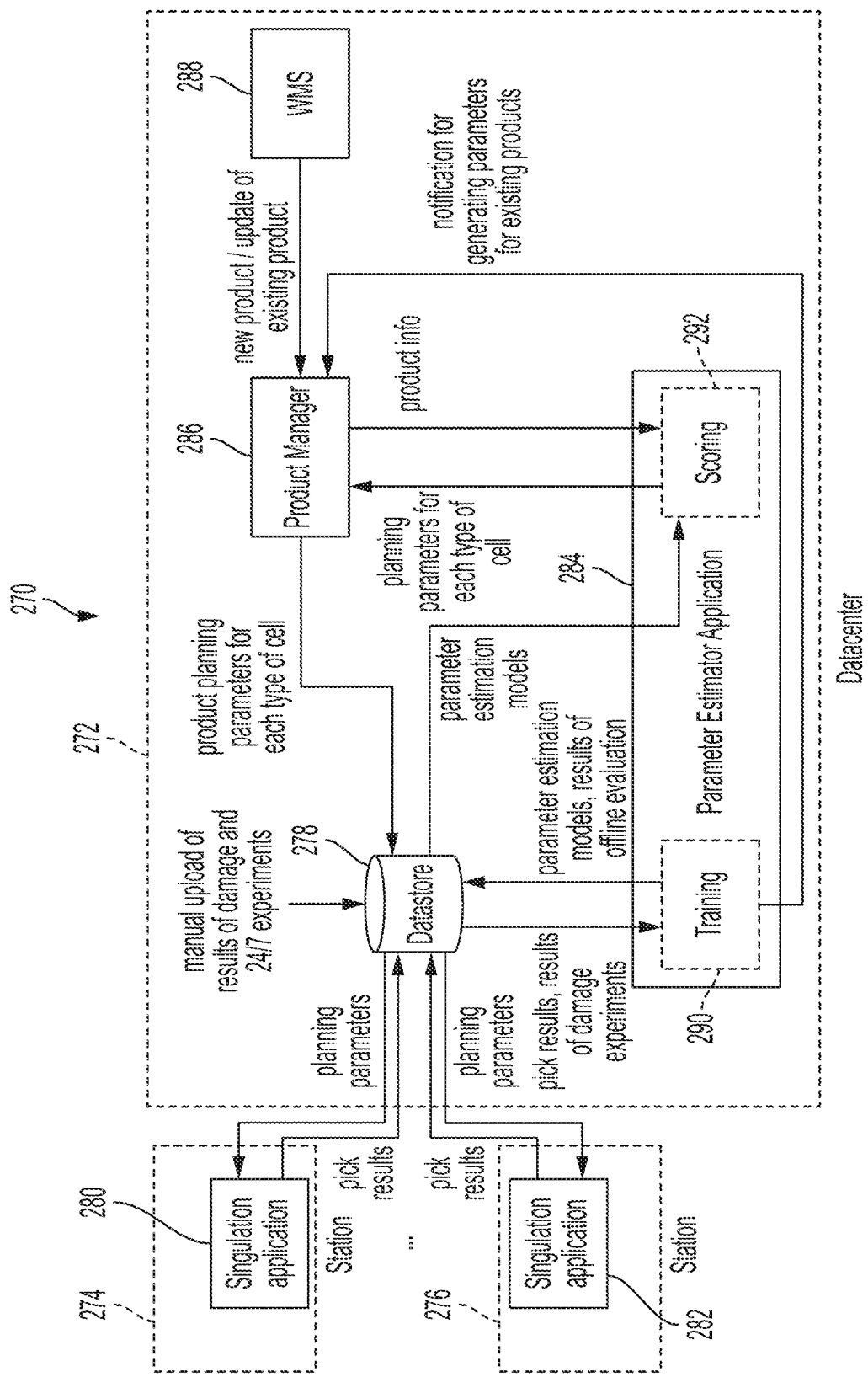
FIG. 26 shows an illustrative diagrammatic view of a functional control system in an induction system accordance with an aspect of the present invention.

FIG. 26 shows at 270 a functional control system for use with system in accordance with an aspect of the invention that includes a central control datacenter 272 that communicates with a plurality of SKU induction stations 274, 276 providing planning parameters from a datastore 278 (of the central control datacenter 272) to singulation stations 280, 282. The pick results from the singulation stations are provided back to the datastore 278, which also receives a manual upload of results of 24/7 experiments as well as product planning parameters for each type of cell from a product manager 286.

The datastore 278 also communicates with a parameter estimator application 284, and in particular provides, for example, pick results and results of damage experiments to a training module 290, which provides parameter estimation models and results of offline evaluation back to the datastore 278. The datastore 278 also provides parameter estimation models to a scoring module 292 of the parameter estimator application 278, and the scoring module 292 is in communication with the product manager 286, providing planning parameters for each type of cell, and receiving from the product manager 286 product information. The product manager 286 also receives notifications for generating parameters for existing products, as well as new product information and update information for existing products from a workflow management system 288.

Closed-loop training is provided in accordance with a further aspect employing a final production model that is used for scoring, and does not have access to drop and plural-pick data and further predicts bad event score from SKU features only. This plural-pick and drop data is referred to herein as privileged features. This data can be used during training but is not available during scoring. The following table summarizes four types of data that will be used in training and scoring modes.

TABLE 1

| ID | Type of data | Source | SKU features | Drop and plural-pick data | Bad event score |
|---|---|---|---|---|---|
| A | Labeled training data | Results of damage experiments, augmented picks results, augmented results of 247 experiments | yes | no | Yes |
| B | Unlabeled scoring data | Products collection in data store | yes | no | No |
| C | Labeled training data with privileged | Results of damage experiments | yes | yes | yes |

TABLE 1-continued

| ID | Type of data | Source | SKU features | Drop and plural-pick data | Bad event score |
|---|---|---|---|---|---|
| D | features Unlabeled training data with privileged features | Pick results, results of 24/7 experiments | yes | yes | No |

Figure 27:
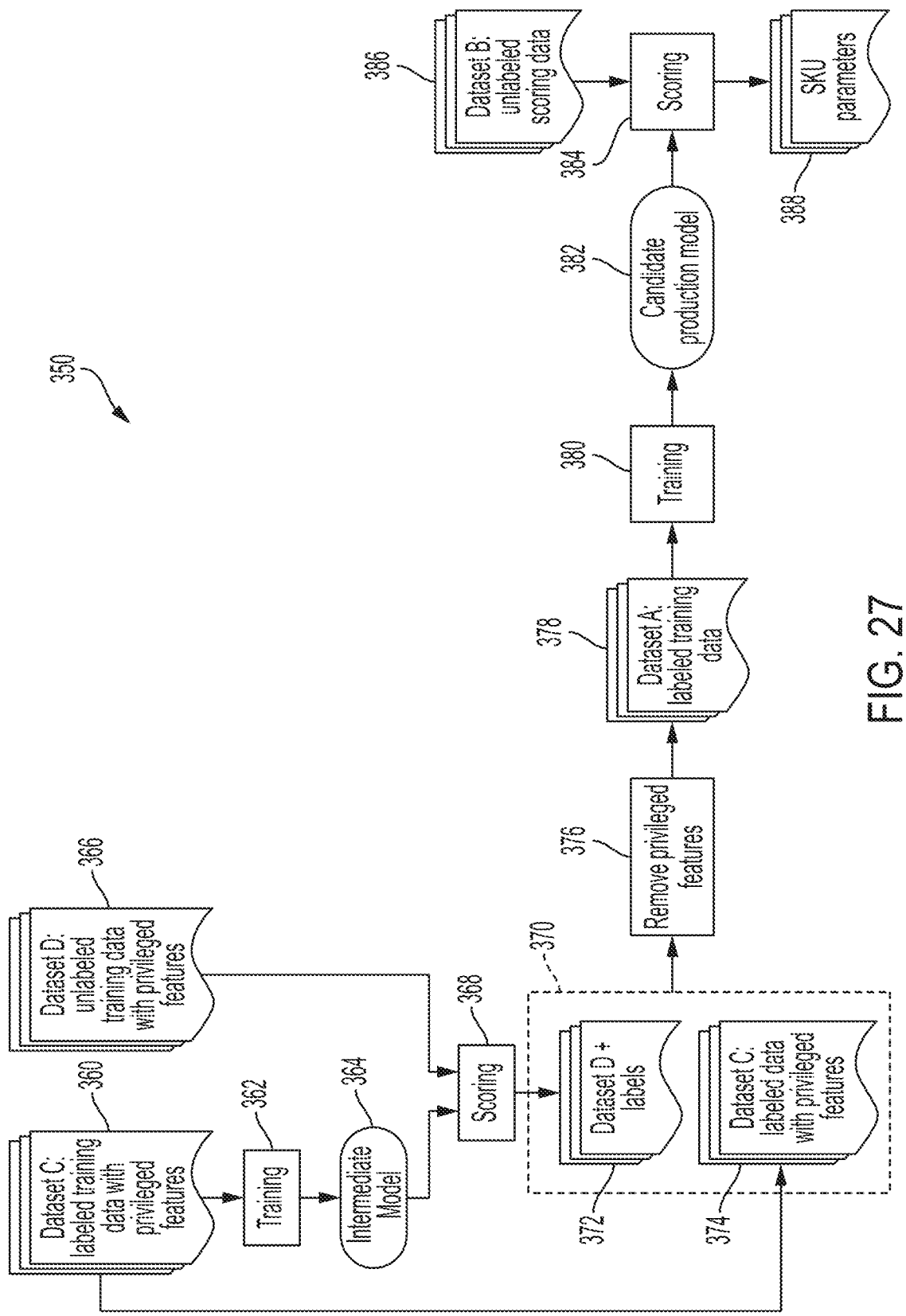
FIG. 27 shows an illustrative diagrammatic view of a parameter estimate application for use in a system in accordance with an aspect of the present invention.

Dataset A is obtained from dataset C by removing privileged features. Parameter estimation application will use self-training approach for training production model of FIG. 27, which shows at 350 the SKU processing steps for the dataset scoring and training. In particular, dataset C (labeled training data with privileged features) 360 is provided to a training module 362, which communicates with an intermediate module 364, and in turn a scoring module 368. The scoring module 368 is also in communication with dataset D that includes unlabeled training data with privileged features 366. The scoring module 368 is in communication with an analysis module 370 that includes the resulting dataset D plus labels 372 as well as the dataset C (labeled training data with privileged features) 374 from dataset C 360.

The analysis module 370 provides data 376 that removes the privileged features to provide dataset A (labeled training data) 378, which is in communication with a further training module 380. The output of the training module 380 is provided to a candidate prediction model 382, and the candidate prediction model 382 is in communication with a further scoring module 384, which receives dataset B (unlabeled scoring data) 386, and provides the SKU parameters 388.

Figure 28:
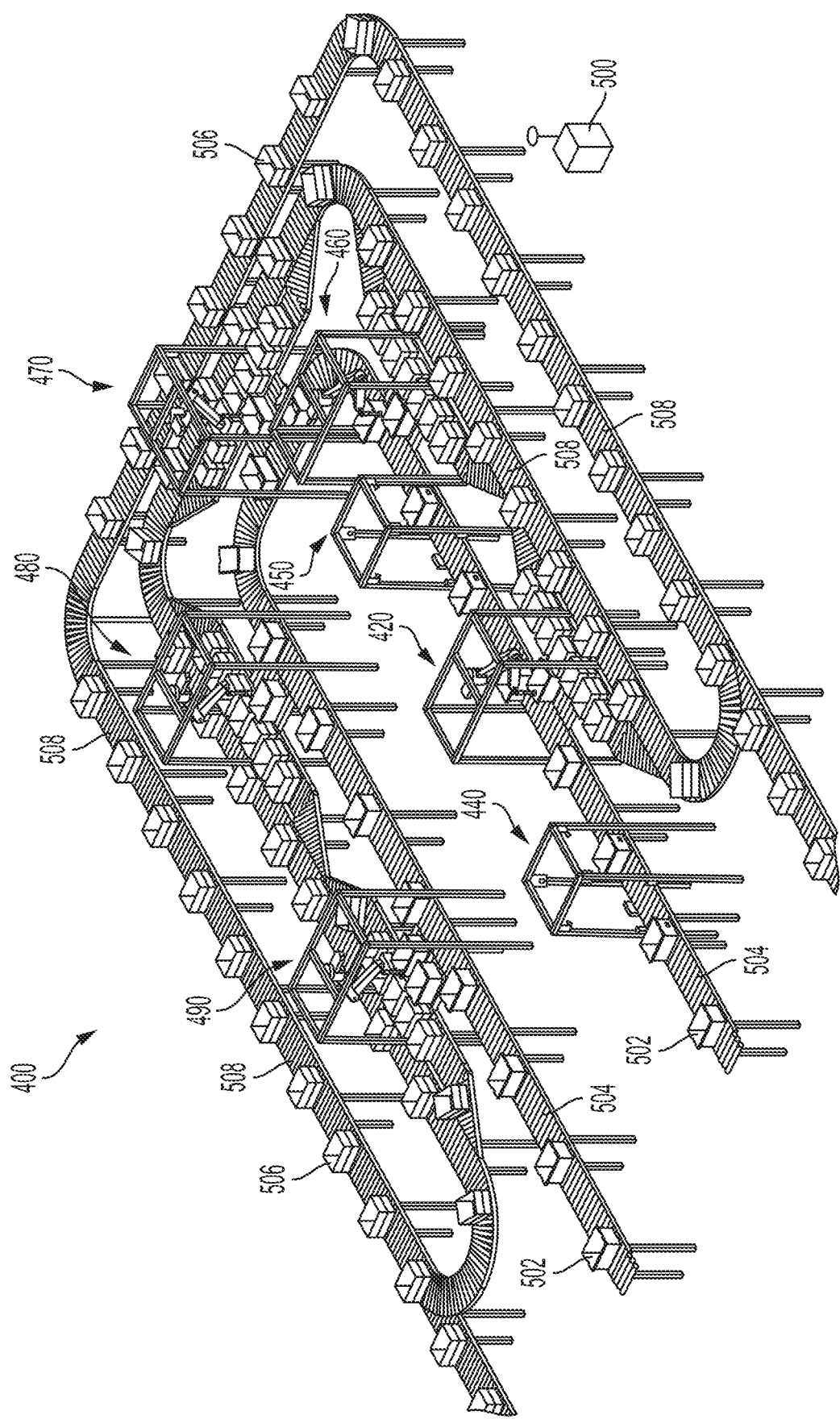
FIG. 28 shows an illustrative diagrammatic view of a processing system with an induction system in accordance with an aspect of the present invention that includes multiple processing stations.

FIG. 28 shows at 400 a system that includes a plurality of object processing systems 420, 460, 470, 480, 490 as discussed above with reference to FIG. 15, and any one or two or more such processing systems may include an associated site intake perception system 440, 450 as also discussed above with reference to the site intake perception system 440 discussed above with reference to FIG. 15. Each site intake perception system 440, 450 may provide checks on the totes as they pass through each system 440, 450, not only visually and volumetrically checking the contents, but also providing information regarding the weight of the contents of the tote as well as redistributing objects within the tote to facilitate later grasping by a robot. Each object processing system 420, 460, 470, 480, 490 is in communication with a common in-feed conveyor 504 on which infeed totes 502 are provided, as well as a common output conveyor 508 on which output containers 506 are provided.

Those skilled in the art will appreciate that numerous modifications and variations may be made to the above disclosed embodiments without departing from the spirit and scope of the present invention.

What is claimed is:

1. An object induction system for assigning handling parameters to an object, said object induction system comprising:
    an analysis system including at least one characteristic perception system for providing characteristic perception data regarding an object to be processed, said characteristic perception data including a weight, height, width, length, center of mass, object description, object category and at least one image;
    an association system including an object information database with characteristic recorded data including at least a weight, height, width, length, center of mass, object description, object category and at least one image for each of a plurality of objects, said association system determining a similarity rank based on a comparison of the characteristic perception data of the object against the characteristic recorded data of a previously inducted object among the plurality of objects stored in the object information database, and said association system associating the object with identifying indicia of the previously inducted object responsive to the similarity rank between the object and the previously inducted object exceeding a threshold; and
    an assignment system for assigning programmable motion device handling parameters associated with the identifying indicia of the previously inducted object for automated handling of the object, said assignment system including a workflow management system as well as a separate operational controller, said programmable motion device handling parameters including at least a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped,
    wherein the separate operational controller of the assignment system routes the programmable motion device handling parameters to a selected object processing system among a plurality of object processing systems, the selected object processing system including a selected programmable motion device capable of using the programmable motion device handling parameters for automated handling of the object.

2. The object induction system as claimed in claim 1, wherein human personnel are permitted to enter any of additional characteristic perception data and additional characteristic recorded data into the object information database.

3. The object induction system as claimed in claim 1, wherein the object is provided with a plurality of homogenous objects in a case, and wherein the case includes case identifying indicia thereon that is perceived by a case perception system to generate case perception data that is provided to the object induction system.

4. The object induction system as claimed in claim 1, further comprising a categorical information input system for obtaining categorical information regarding the object, said categorical information including data relating to any of whether the object is able to roll following placement, whether the object is fragile, whether the object is stackable, whether the object is crushable, whether the object is deformable, whether the object is too thin to be processed, whether the object includes glass and whether the object is non-rigid.

5. The object induction system as claimed in claim 4, wherein said association system determines a similarity rank based on a comparison of the characteristic perception data and the categorical information for the object against the characteristic recorded data for the previously inducted object.

6. The object induction system as claimed in claim 4, wherein the programmable motion device handling parameters include routing instructions for routing the object to the selected programmable motion device among a plurality of programmable motion devices included in the plurality of object processing systems.

7. The object induction system as claimed in claim 1, wherein the plurality of object processing systems include at least one object processing system that includes a specialized programmable motion device.

8. An object induction system, comprising:
an analysis system including at least one characteristic perception system for providing characteristic perception data regarding an object to be processed, said characteristic perception data including data relating to a weight, height, width, length, center of mass, object description, object category and at least one image;
a categorical information input system for obtaining categorical information regarding the object, said categorical information including data relating to any of whether the object is able to roll following placement, whether the object is fragile, whether the object is stackable, whether the object is crushable, whether the object is deformable, whether the object is too thin to be processed, whether the object includes glass and whether the object is non-rigid;
an association system including an object information database with characteristic recorded data including at least a weight, height, width, length, center of mass, object description, object category and at least one image for each of a plurality of objects, said association system determining a similarity rank based on a comparison of the characteristic perception data and the categorical information regarding the object against the characteristic recorded data of a previously inducted object among the plurality of objects stored in the object information database, and said association system associating the object with identifying indicia of the previously inducted object responsive to the similarity rank between the object and the previously inducted object exceeding a threshold; and
an assignment system for assigning programmable motion device handling parameters associated with the identifying indicia of the previously inducted object for automated handling of the object, said assignment system including a workflow management system as well as a separate operational controller, said programmable motion device handling parameters including at least a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped,
wherein the separate operational controller of the assignment system routes the programmable motion device handling parameters to a selected object processing system among a plurality of object processing systems, the selected object processing system including a selected programmable motion device capable of using the programmable motion device handling parameters for automated handling of the object.

9. The object induction system as claimed in claim 8, wherein human personnel are permitted to enter any of additional characteristic perception data and additional categorical information into the object information database.

10. The object induction system as claimed in claim 8, wherein the object is provided with a plurality of homogenous objects in a case, and wherein the case includes case identifying indicia thereon that is perceived by a case perception system to generate case perception data that is provided to the object induction system.

11. The object induction system as claimed in claim 8, wherein the programmable motion device handling parameters include data regarding whether the object is acceptable for processing by the selected programmable motion device.

12. The object induction system as claimed in claim 8, wherein programmable motion device handling parameters include routing instructions for routing the object to the selected programmable motion device among a plurality of programmable motion devices included in the plurality of object processing systems.

13. The object induction system as claimed in claim 8, wherein the plurality of object processing systems include at least one object processing system that includes a specialized programmable motion device.

14. An object induction system, comprising:
an indicia perception system for providing indicia perception data regarding identifying indicia of an object to be processed;
an analysis system including at least one characteristic perception system for providing characteristic perception data regarding the object to be processed, said characteristic perception data including a weight, height, width, length, center of mass, object description, object category and at least one image;
a categorical information input system for obtaining categorical information regarding the object, said categorical information including data relating to any of whether the object is able to roll following placement, whether the object is fragile, whether the object is stackable, whether the object is crushable, whether the object is deformable, whether the object is too thin to be processed, whether the object includes glass and whether the object is non-rigid;
a non-transitory medium for storing the characteristic perception data and the categorical information as associated with the indicia perception data;
an association system including an object information database with characteristic recorded data including at least a weight, height, width, length, center of mass, object description, object category and at least one image for each of a plurality of objects, said association system determining a similarity rank based on a comparison of the characteristic perception data and the categorical information regarding the object against the characteristic recorded data of a previously inducted object among the plurality of objects stored in the object information database, and said association system associating the object with identifying indicia of the previously inducted object responsive to the similarity rank between the object and the previously inducted object exceeding a threshold; and an assignment system for assigning programmable motion device handling parameters associated with the identifying indicia of the previously inducted object to the indicia perception data for automated handling of the object, said programmable motion device handling parameters including at least a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped, wherein the assignment system routes the programmable motion device handling parameters to a selected object processing system among a plurality of object processing systems, the selected object processing system including a selected programmable motion device capable of using the programmable motion device handling parameters for automated handling of the object.

15. The object induction system as claimed in claim 14, wherein human personnel are permitted to enter any of additional characteristic perception data and additional categorical information into the object information database.

16. The object induction system as claimed in claim 14, wherein the object is provided with a plurality of homogenous objects in a case, and wherein the case includes case identifying indicia thereon that is perceived by a case perception system to generate case perception data that is provided to the object induction system.

17. The object induction system as claimed in claim 14, wherein the programmable motion device handling parameters include data regarding whether the object is acceptable for processing by the selected programmable motion device.

18. The object induction system as claimed in claim 14, wherein the programmable motion device handling parameters include routing instructions for routing the object to the selected programmable motion device among a plurality of programmable motion devices included in the plurality of object processing systems.

19. The object induction system as claimed in claim 14, wherein the plurality of object processing systems include at least one object processing system that includes a specialized programmable motion device.

20. A method of for assigning handling parameters to an object, said method comprising:

providing indicia perception data regarding identifying indicia of an object to be processed;

providing characteristic perception data regarding the object to be processed, said characteristic perception data including data relating to any of a weight, height, width, length, center of mass, object description, object category and at least one image;

obtaining categorical information regarding the object, said categorical information including data relating to any of whether the object is able to roll following placement, whether the object is fragile, whether the object is stackable, whether the object is crushable, whether the object is deformable, whether the object is too thin to be processed, whether the object includes glass and whether the object is non-rigid;

storing the characteristic perception data and the categorical information of the object as associated with the indicia perception data in an object information database;

storing characteristic recorded data including at least a weight, height, width, length, center of mass, object description, object category and at least one image for each of a plurality of objects in the object information database;

determining a similarity rank based on a comparison of the characteristic perception data and the categorical information regarding the object against the characteristic recorded data of a previously inducted object among the plurality of objects stored in the object information database;

associating the object with identifying indicia of the previously inducted object responsive to the similarity rank between the object and the previously inducted object exceeding a threshold;

assigning programmable motion device handling parameters associated with the identifying indicia of the previously inducted object to the indicia perception data for automated handling of the object, said programmable motion device handling parameters including at least a vacuum pressure at an end effector, a size of a vacuum cup at the end effector, a maximum speed of movement of the end effector, a maximum angular acceleration of the end effector, a maximum linear acceleration of the end effector, a location at which to engage the object with the end effector, and a pose at which to hold the object by the end effector when grasped, and routing the programmable motion device handling parameters to a selected object processing system among a plurality of object processing systems, the selected object processing system including a selected programmable motion device capable of using the programmable motion device handling parameters for automated handling of the object.

21. The method as claimed in claim 20, wherein the method further includes permitting human personnel to enter any of additional characteristic perception data and additional categorical information into the object information database.

22. The method as claimed in claim 20, wherein the object is provided with a plurality of homogenous objects in a case, and wherein the case includes case identifying indicia thereon that is perceived by a case perception system to generate case perception data that is provided to the object induction system.

23. The method system as claimed in claim 20, wherein the programmable motion device handling parameters include data regarding whether the object is acceptable for processing by the selected programmable motion device.

* * * * *